(12) United States Patent
Thornton et al.

(10) Patent No.: US 8,560,882 B2
(45) Date of Patent: *Oct. 15, 2013

(54) METHOD AND APPARATUS FOR REBUILDING DATA IN A DISPERSED DATA STORAGE NETWORK

(75) Inventors: Vance T. Thornton, Chicago, IL (US); James Bellanca, Chicago, IL (US); Dustin M. Hendrickson, Biggsville, IL (US); Zachary J. Mark, Chicago, IL (US); Ilya Volvovski, Chicago, IL (US)

(73) Assignee: Cleversafe, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/716,106

(22) Filed: Mar. 2, 2010

(65) Prior Publication Data
US 2010/0161916 A1    Jun. 24, 2010

Related U.S. Application Data

(63) Continuation of application No. 12/648,691, filed on Dec. 29, 2009, now Pat. No. 8,352,782, and a continuation-in-part of application No. 11/403,391, filed on Apr. 13, 2006, now Pat. No. 7,546,427, which is a continuation-in-part of application No. 11/241,555, filed on Sep. 30, 2005, now Pat. No. 7,953,937, application No. 12/648,691, which is a continuation-in-part of application No. 12/080,042, filed on Mar. 31, 2008, which is a continuation-in-part of application No. 11/973,542, filed on Oct. 9, 2007.

(60) Provisional application No. 61/141,428, filed on Dec. 30, 2008.

(51) Int. Cl.
*G06F 11/00*    (2006.01)

(52) U.S. Cl.
USPC ........................................ 714/6.24

(58) Field of Classification Search
USPC .............................................. 714/6.22, 6.24
See application file for complete search history.

(56) References Cited

U.S. PATENT DOCUMENTS

| 4,092,732 A | 5/1978 | Ouchi |
| 5,454,101 A | 9/1995 | Mackay et al. |

(Continued)

FOREIGN PATENT DOCUMENTS

WO    2007103533 A1    9/2007

OTHER PUBLICATIONS

Shamir; How to Share a Secret; Communications of the ACM; vol. 22, No. 11; Nov. 1979; pp. 612-613.

(Continued)

*Primary Examiner* — Joshua Lohn
(74) *Attorney, Agent, or Firm* — Garlick & Markison; Timothy W. Markison

(57) ABSTRACT

A method begins by identifying a data slice requiring rebuilding to produce an identified data slice, wherein the identified data slice is one of a plurality of data slices that constitute a data segment and wherein each of the plurality of data slices is assigned for storage by a corresponding one of a plurality of data slice servers. The method continues by retrieving at least m number of data slices from at least m number of the plurality of data slice servers, wherein m data slices of the plurality of data slices enable reconstruction of the data segment, and wherein the at least m number of data slices does not include the identified data slice. The method continues by reconstructing the identified data slice from the at least m number of data slices to produce a rebuilt data slice. The method continues by writing the rebuilt data slice to the corresponding one of the plurality of data slice servers or to a new slice server.

11 Claims, 20 Drawing Sheets

(56) References Cited

U.S. PATENT DOCUMENTS

| | | | |
|---|---|---|---|
| 5,485,474 A | 1/1996 | Rabin | |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,446,237 B1* | 9/2002 | Menon | 714/800 |
| 6,449,688 B1 | 9/2002 | Peters et al. | |
| 6,516,425 B1* | 2/2003 | Belhadj et al. | 714/6.12 |
| 6,567,948 B2 | 5/2003 | Steele et al. | |
| 6,571,282 B1 | 5/2003 | Bowman-Amuah | |
| 6,571,351 B1* | 5/2003 | Mitaru et al. | 714/6.12 |
| 6,609,223 B1 | 8/2003 | Wolfgang | |
| 6,647,514 B1* | 11/2003 | Umberger et al. | 714/42 |
| 6,718,361 B1 | 4/2004 | Basani et al. | |
| 6,742,081 B2* | 5/2004 | Talagala et al. | 711/114 |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,842,422 B1* | 1/2005 | Bianchini, Jr. | 370/216 |
| 6,879,596 B1 | 4/2005 | Dooply | |
| 6,959,413 B2* | 10/2005 | Humlicek et al. | 714/807 |
| 6,981,171 B2* | 12/2005 | Hashemi | 714/5.11 |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,461 B1* | 12/2006 | Kiselev et al. | 711/114 |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,546,427 B2* | 6/2009 | Gladwin et al. | 711/154 |
| 2002/0062422 A1* | 5/2002 | Butterworth et al. | 711/114 |
| 2002/0166079 A1* | 11/2002 | Ulrich et al. | 714/6 |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2003/0120723 A1* | 6/2003 | Bright et al. | 709/203 |
| 2004/0024963 A1 | 2/2004 | Talagala et al. | |
| 2004/0122917 A1 | 6/2004 | Menon et al. | |
| 2004/0215998 A1 | 10/2004 | Buxton et al. | |
| 2004/0228493 A1 | 11/2004 | Ma et al. | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula, Jr. | |
| 2005/0132070 A1 | 6/2005 | Redlich et al. | |
| 2005/0144382 A1 | 6/2005 | Schmisseur | |
| 2005/0144514 A1 | 6/2005 | Ulrich et al. | |
| 2005/0229069 A1 | 10/2005 | Hassner | |
| 2006/0041782 A1* | 2/2006 | Ali et al. | 714/6 |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0218433 A1* | 9/2006 | Williams | 714/6 |
| 2006/0224603 A1 | 10/2006 | Correll, Jr. | |
| 2007/0079081 A1* | 4/2007 | Gladwin et al. | 711/154 |
| 2007/0079082 A1* | 4/2007 | Gladwin et al. | 711/154 |
| 2007/0079083 A1 | 4/2007 | Gladwin et al. | |
| 2007/0088970 A1* | 4/2007 | Buxton et al. | 714/2 |
| 2007/0143359 A1 | 6/2007 | Uppala | |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0283167 A1 | 12/2007 | Venters, III et al. | |
| 2008/0183975 A1* | 7/2008 | Foster et al. | 711/153 |
| 2009/0094251 A1 | 4/2009 | Gladwin et al. | |
| 2009/0094318 A1 | 4/2009 | Gladwin et al. | |
| 2010/0023524 A1 | 1/2010 | Gladwin et al. | |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, Ti: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

European Patent Office; Extended European Search Report; Application No. 08837248.7; Jul. 19, 2012; 7 pgs.

* cited by examiner

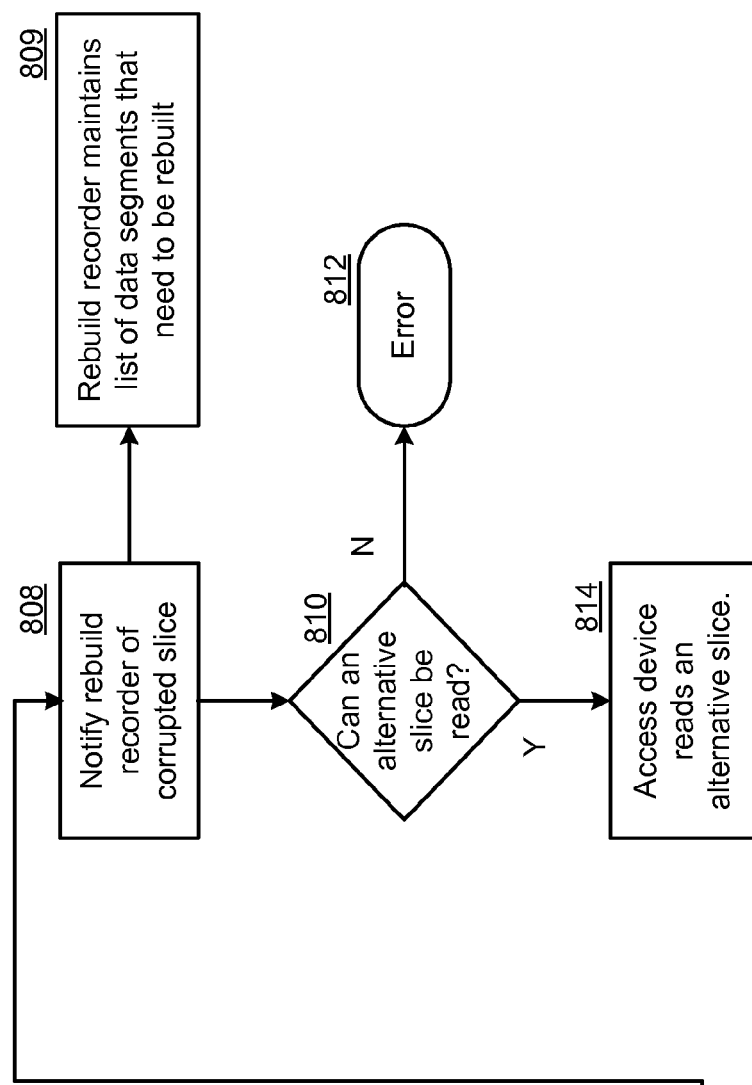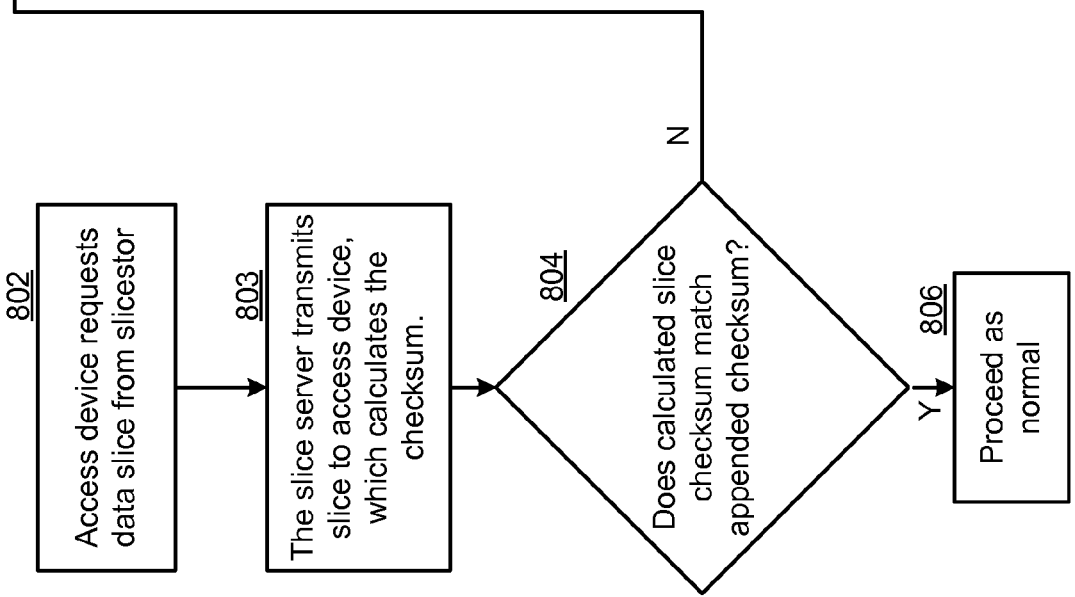
Fig. 8

Table 1

| Data Segment | Slice Server A 1502 | Slice Server B 1504 | Slice Server C 1506 |
|---|---|---|---|
| 0 | 100 | 100 | 100 |
| 1 | 99 | (missing) | 99 |
| 2 | 100 | 100 | 100 |
| 3 | 101 | 101 | 100 |
| 4 | 102 | 99 | (checksum corrupted) |

1512, 1514, 1516, 1518, 1520

Table 2

Rebuild List

METHOD AND APPARATUS FOR REBUILDING DATA IN A DISPERSED DATA STORAGE NETWORK

CROSS-REFERENCE TO RELATED APPLICATIONS

This patent application is claiming priority under 35 USC §120 as a continuing patent application of co-pending patent application entitled Range Based Rebuilder For Use With A Dispersed Data Storage Network, having a filing date of Dec. 29, 2009, and a Ser. No. 12/648,691, which claims priority pursuant to 35 U.S.C. §119(e) to U.S. Provisional Application Ser. No. 61/141,428, entitled "Range Based rebuilding for Use with a Dispersed Data Storage Network," filed Dec. 30, 2008, pending, which is hereby incorporated herein by reference in its entirety and made part of the present U.S. Utility Patent Application for all purposes.

U.S. Utility Application Ser. No. 12/648,691 claims priority pursuant to 35 U.S.C. §120, as a continuation-in-part (CIP), to the following U.S. Utility Patent Application which is hereby incorporated herein by reference in its entirety and made part of the present U.S. Utility Patent Application for all purposes:

1. U.S. Utility application Ser. No. 11/403,391, entitled "System for Rebuilding Dispersed Data," filed Apr. 13, 2006, now U.S. Pat. No. 7,546,427, which is a continuation-in-part (CIP), to U.S. Utility application Ser. No. 11/241,555, filed Sep. 30, 2005, pending; and
2. U.S. Utility application Ser. No. 12/080,042, entitled "Rebuilding Data on a Dispersed Storage Network," filed Mar. 31, 2008, pending; which is a continuation-in-part (CIP) to U.S. Utility application Ser. No. 11/973, 542, filed Oct. 9, 2007, pending.

The following applications are also incorporated by reference in their entirety:

1. U.S. Utility application Ser. No. 11/973,621, entitled "Virtualized Storage Vaults on a Dispersed Data Storage Network", filed Oct. 9, 2007.
2. U.S. Utility application Ser. No. 11/973,622, entitled "Smart Access To A Dispersed Data Storage Network", filed Oct. 9, 2007.

FIELD OF THE INVENTION

The present invention relates generally to systems, apparatus, and methods for distributed data storage, and more particularly to systems, apparatus, and methods for distributed data storage using an information dispersal algorithm so that no one location will store an entire copy of stored data, and more particularly still to systems, apparatus, and methods for rebuilding data on a dispersed data storage network that has been damaged, compromised or has experienced failure during read and write operations.

DESCRIPTION OF THE PRIOR ART

Storing data in digital form is a well-known problem associated with all computer systems, and numerous solutions to this problem are known in the art. The simplest solution involves merely storing digital data in a single location, such as a punch film, hard drive, or FLASH memory device. However, storage of data in a single location is inherently unreliable. The device storing the data can malfunction or be destroyed through natural disasters, such as a flood, or through a malicious act, such as arson. In addition, digital data is generally stored in a usable file, such as a document that can be opened with the appropriate word processing software, or a financial ledger that can be opened with the appropriate spreadsheet software. Storing an entire usable file in a single location is also inherently insecure as a malicious hacker only need compromise that one location to obtain access to the usable file.

To address reliability concerns, digital data is often "backed-up," i.e., an additional copy of the digital data is made and maintained in a separate physical location. For example, a backup tape of all network drives may be made by a small office and maintained at the home of a trusted employee. When a backup of digital data exists, the destruction of either the original device holding the digital data or the backup will not compromise the digital data. However, the existence of the backup exacerbates the security problem, as a malicious hacker can choose between two locations from which to obtain the digital data. Further, the site where the backup is stored may be far less secure than the original location of the digital data, such as in the case when an employee stores the tape in their home.

Another method used to address reliability and performance concerns is the use of a Redundant Array of Independent Drives ("RAID"). RAID refers to a collection of data storage schemes that divide and replicate data among multiple storage units. Different configurations of RAID provide increased performance, improved reliability, or both increased performance and improved reliability. In certain configurations of RAID, when digital data is stored, it is split into multiple units, referred to as "stripes," each of which is stored on a separate drive. Data striping is performed in an algorithmically certain way so that the data can be reconstructed. While certain RAID configurations can improve reliability, RAID does nothing to address security concerns associated with digital data storage.

One method that prior art solutions have addressed security concerns is through the use of encryption. Encrypted data is mathematically coded so that only users with access to a certain key can decrypt and use the data. Common forms of encryption include DES, AES, RSA, and others. While modern encryption methods are difficult to break, numerous instances of successful attacks are known, some of which have resulted in valuable data being compromised.

Digitally stored data is subject to degradation over time, although such degradation tends to be extremely minor and the time periods involved tend to be much longer than for analog data storage. Nonetheless, if a single bit within a file comprised of millions of bits changes from a zero to a one or vice versa, the integrity of the file has been compromised, and its usability becomes suspect. Further, errors occur more frequently when digital data is transmitted due to noise in the transmission medium. Various prior art techniques have been devised to detect when a digital data segment has been compromised. One early form of error detection is known as parity, wherein a single bit is appended to each transmitted byte or word of data. The parity bit is set so that the total number of one bit in the transmitted byte or word is either even or odd. The receiving processor then checks the received byte or word for the appropriate parity, and, if it is incorrect, asks that the byte or word be re-sent.

Another form of error detection is the use of a checksum. There are many different types of checksums including classic checksums, cryptographic hash functions, digital signatures, cyclic redundancy checks, and the use of human readable "check digits" by the postal service and libraries. All of these techniques involve performing a mathematical calculation over an entire data segment to arrive at a checksum, which is appended to the data segment. For stored data, the checksum for the data segment can be recalculated periodically, and checked against the previously calculated checksum appended to the data segment. For transmitted data, the checksum is calculated by the transmitter and appended to the data segment. The receiver then recalculates the checksum for the received data segment, and if it does not match the checksum appended to the data segment, requests that it be retransmitted.

In 1979, two researchers independently developed a method for splitting data among multiple recipients called "secret sharing." One of the characteristics of secret sharing is that a piece of data may be split among n recipients, but cannot be known unless at least t recipients share their data, where n≥t. For example, a trivial form of secret sharing can be implemented by assigning a single random byte to every recipient but one, who would receive the actual data byte after it had been bitwise exclusive orred with the random bytes. In other words, for a group of four recipients, three of the recipients would be given random bytes, and the fourth would be given a byte calculated by the following formula:

$$s'=s \oplus r_a \oplus r_b \oplus r_c,$$

where s is the original source data, $r_a$, $r_b$, and $r_c$ are random bytes given to three of the four recipients, and s' is the encoded byte given to the fourth recipient. The original byte s can be recovered by bitwise exclusive-orring all four bytes together.

The problem of maintaining or reconstructing data stored on a digital medium that is subject to damage has also been addressed in the prior art. In particular, Reed-Solomon and Cauchy Reed-Solomon coding are two well-known methods of dividing encoded information into multiple slices so that the original information can be reassembled even if all of the slices are not available. Reed-Solomon coding, Cauchy Reed-Solomon coding, and other data coding techniques are described in "Erasure Codes for Storage Applications," by Dr. James S. Plank, which is hereby incorporated by reference.

Schemes for implementing dispersed data storage networks are also known in the art. In particular, U.S. Pat. No. 5,485,474, issued to Michael O. Rabin, describes a system for splitting a segment of digital information into n data slices, which are stored in separate devices. When the data segment must be retrieved, only m of the original data slices are required to reconstruct the data segment, where n>m.

While dispersed data storage networks can theoretically be implemented to provide any desired level of reliability, practical considerations tend to make this impossible in prior art solutions. For example, dispersed data storage networks rely on storage media to store data slices. This storage media, like all storage media, will degrade over time. Furthermore, dispersed data storage networks rely on numerous transmissions to physically disparate slice servers, and data slices may become corrupted during transmissions. While TCP utilizes a CRC in every transmitted packet, the reliability provided by this CRC is not sufficient for critical data storage.

Since April of 2006, Cleversafe, Inc. of Chicago, Ill. has developed a number of algorithms for rebuilding corrupted or destroyed data stored on a dispersed data storage network. As explained in previous applications, all of which are referenced by this application, these rebuilders worked by noting the corruption, destruction, or unavailability of a data slice based on a scan of stored data slices, or a failed operation on a data slice. This process is effective, but is not optimized to deal with instances where a large number of related data slices are corrupted or destroyed, such as, for example, when a drive is replaced or destroyed.

BRIEF DESCRIPTION OF THE DRAWINGS

FIG. 8 is a flowchart illustrating a process for discovery of corrupt data occurring during the course of a normal read operation, in accordance with an embodiment of the disclosed invention;

FIG. 15 is an illustration of data that may be maintained by a rebuild process operating in accordance with an embodiment of the disclosed invention;

DETAILED DESCRIPTION OF THE ILLUSTRATED EMBODIMENT

Figure 1:
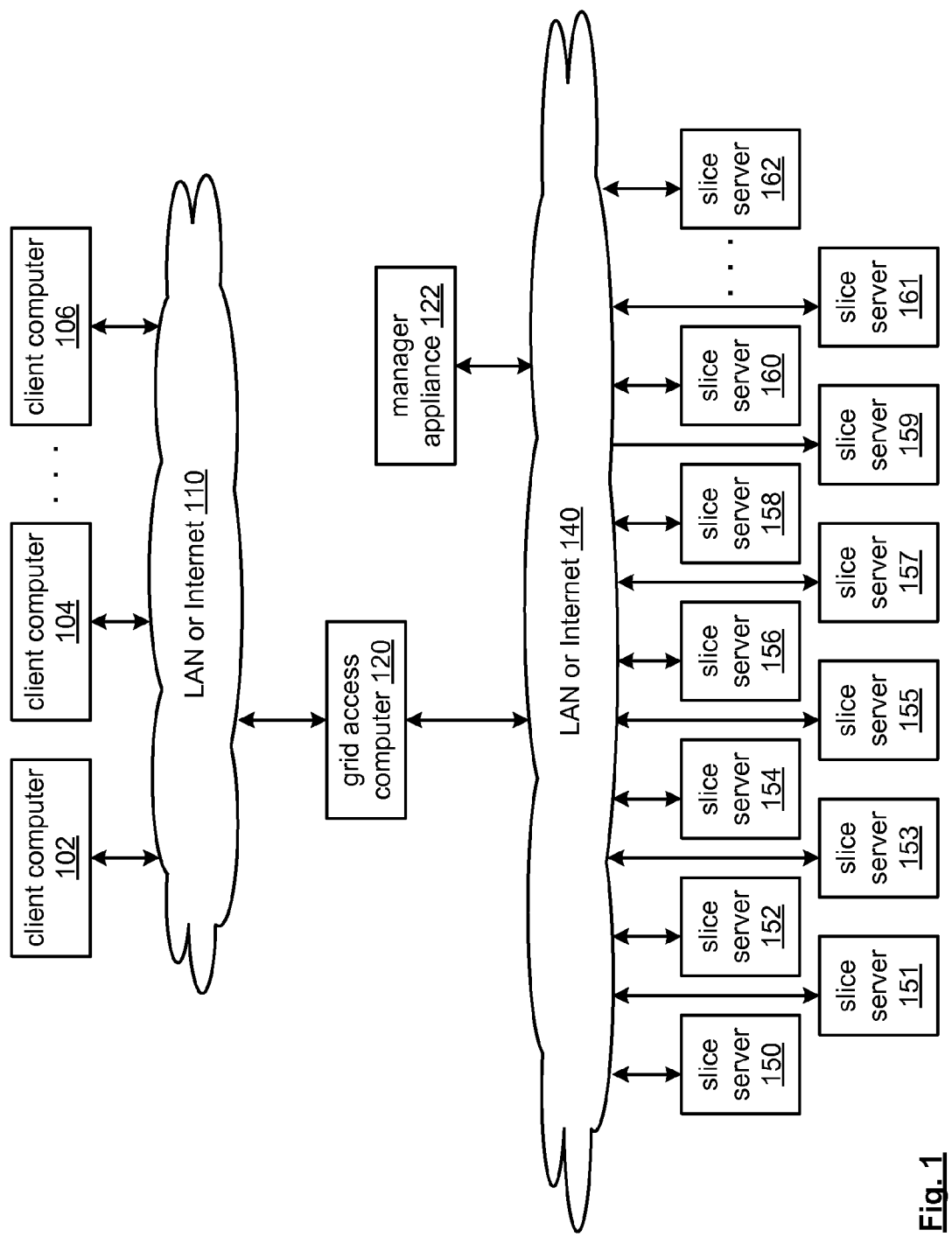
FIG. 1 is a network diagram of a dispersed data storage network constructed in accordance with an embodiment of the disclosed invention.

Turning to the Figures, and to FIG. 1 in particular, a distributed computer system implementing a dispersed data storage network 100 is shown. An arbitrary number of slice servers 150-162 store data slices sent to them by networked client computers 102, 104, and 106. As illustrated, a grid access computer 120 allows access to the slice servers 150-162 by the client computers 102, 104, and 106. In a dispersed data storage network, the grid access computer 120 acts as a router for data sent between a source computer and multiple slice servers 150-162. It manages transactions at the data segment level. A manager appliance 122 monitors the activities and status of the grid access computer 120 and the slice servers 150-162. The manager appliance reports on statistics and events related to appliance health, network throughput, authentication attempts, read and write transaction counts, and rebuilding activities. It notifies users when events that could signal a problem occur.

As explained herein, the disclosed invention works to ensure the integrity of data stored in a dispersed data network not only by using checksums on each stored data segment as well as the constituent data slices, but also by reconstructing compromised data slices as well. In accordance with the disclosed invention, the grid access computer 120 will calculate a checksum for each data segment to be stored, and append the checksum to the data segment prior to slicing. The data segment is then sliced in accordance with an information dispersal algorithm, and checksums are calculated and appended to each of the data slices. The data slices are then forwarded to slice servers 150-162, where the data slices are stored.

In addition, the access computer 120 also recreates data slices that have become corrupted, or were destroyed. If during operation of the dispersed data storage network 100, it is detected that a particular data slice has been corrupted or destroyed, a different data slice will be requested from a different slice server 150-162. Assuming that sufficient non-corrupted data slices exist to successfully reconstruct the original data segment, the reconstructed data segment will be re-sliced, and the corrupted data slice will be replaced with a non-corrupted version. Further, a rebuilder application operating within the dispersed data storage network periodically walks through all data slices stored on the dispersed data storage network. When a corrupted data slice is found, the rebuilder application identifies the data segment corresponding to the corrupted data slice, rebuilds the identified data segment, and rewrites the corrupted slice. Moreover, the rebuilder application actively engages in a detection process to identify corrupted, damaged, missing, and outdated data slices.

Figure 2:
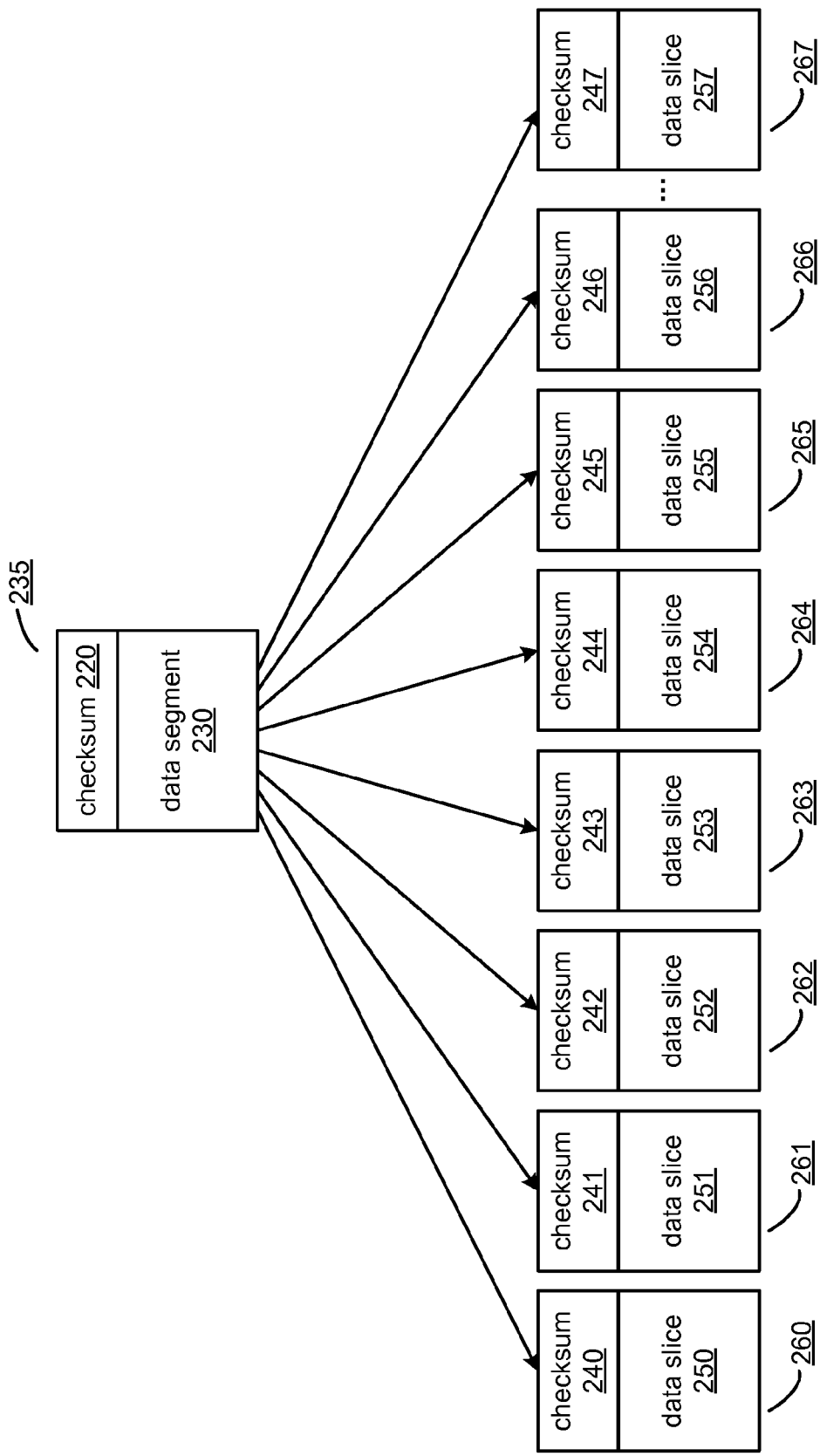
FIG. 2 illustrates the use of checksums on a data segment as well as on an arbitrary number of data slices created from the data segment.

FIG. 2 depicts a system 235 that demonstrates the use of a checksum 220 on a data segment 230, as well as on the data slices 250-257 that the data segment 230 was divided into. Assuming that a data segment 230 is being written to a dispersed data storage network, a checksum 220 will be calculated for and appended to the data segment 230, thereby forming a "certified data segment." The certified data segment 230 will then be sliced as one piece of data resulting in data slices 250-257, i.e., when the data slices 250-257 are recombined, both the data segment 230 and data segment checksum 220 will be recovered. A checksum 240-247 is then calculated for, and appended to each data slice 250-257, forming "certified data slices" 260-267. The certified data slices 260-267 will then be sent to different slice servers.

Figure 3:
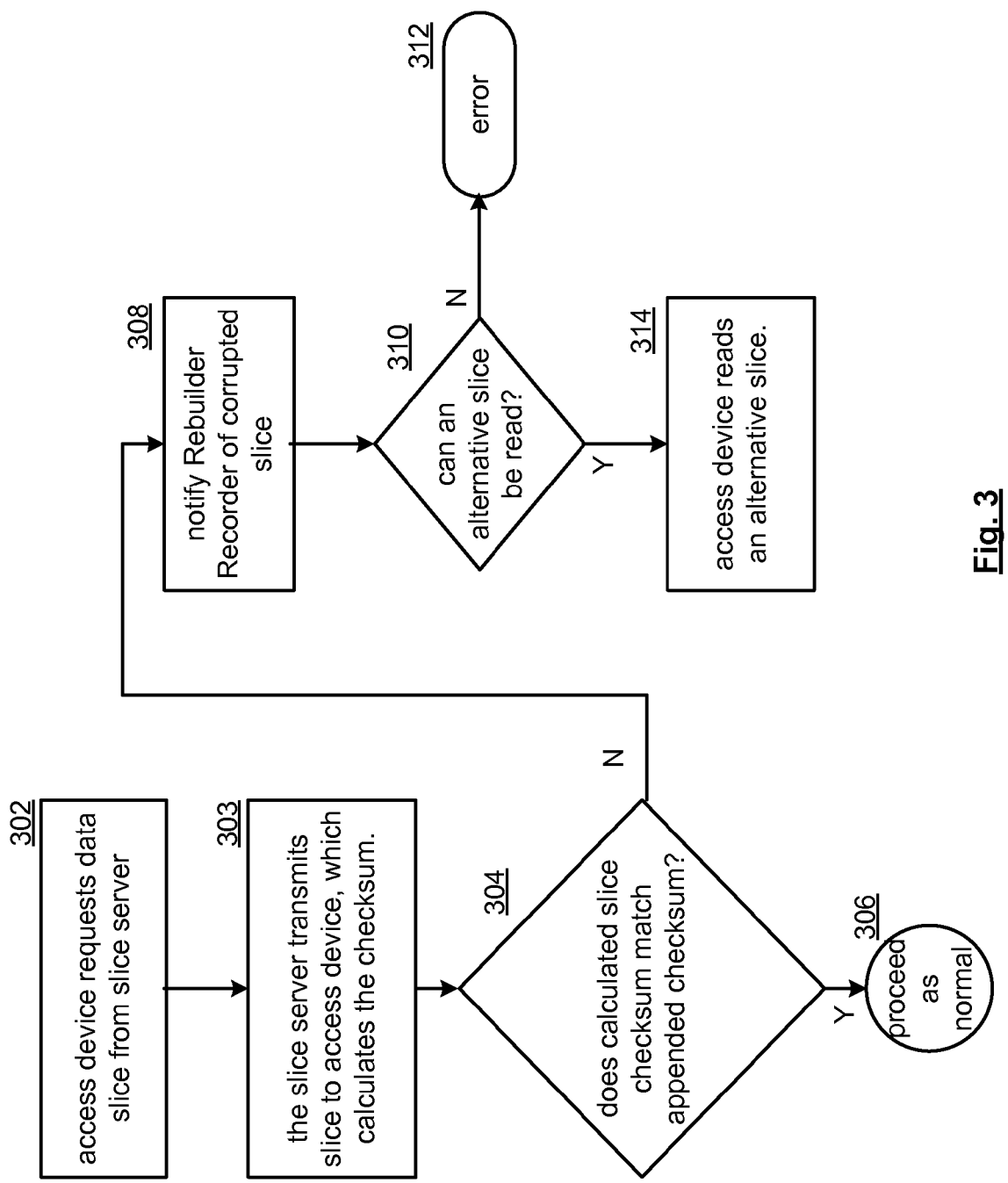
FIG. 3 is a flowchart illustrating the process by which a corrupted data segment can be rebuilt by a dispersed data storage network constructed in accordance with an embodiment of the disclosed invention.

FIG. 3 depicts one possible process by which corrupted slices may be recreated. During a read operation of the dispersed data storage network, a client requests a slice from a slice server in step 302. In step 303, the slice server transmits the requested slice to the client, which calculates a checksum for the requested data slice. In step 304, the calculated checksum is compared to the checksum appended to the stored data slice, and if the two checksums match, the read proceeds as normal in step 306. However, if the two checksums do not match, the slice server will transmit a message to a rebuilder application operating on the dispersed data storage network indicating that the requested data slice is corrupted in step 308, and return "Failure" to the querying server. In step 310, the grid access computer determines if an alternative slice can be read from a different slice server. If an alternative slice does not exist, the grid access computer will report an error in step 312. In step 314, the grid access computer reads the alternative slice.

Figure 4C:
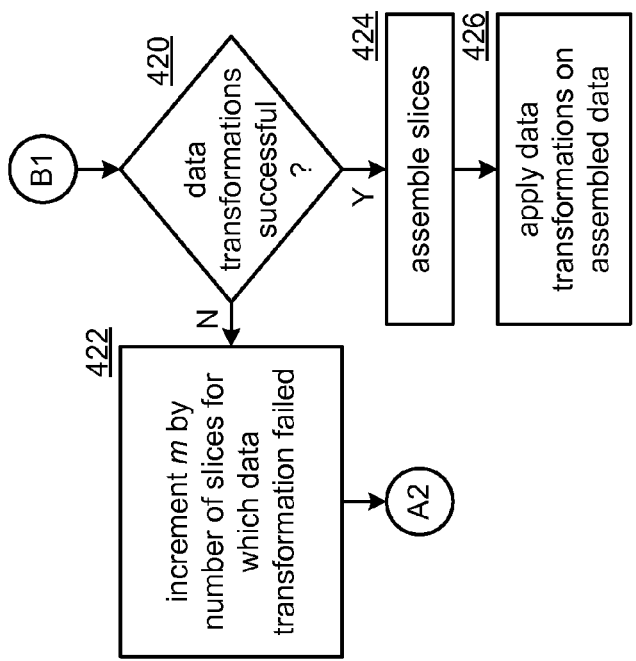
FIGS. 4A-4C collectively illustrate a read operation from a dispersed data storage network constructed in accordance with an embodiment of the disclosed invention.
Figure 4B:
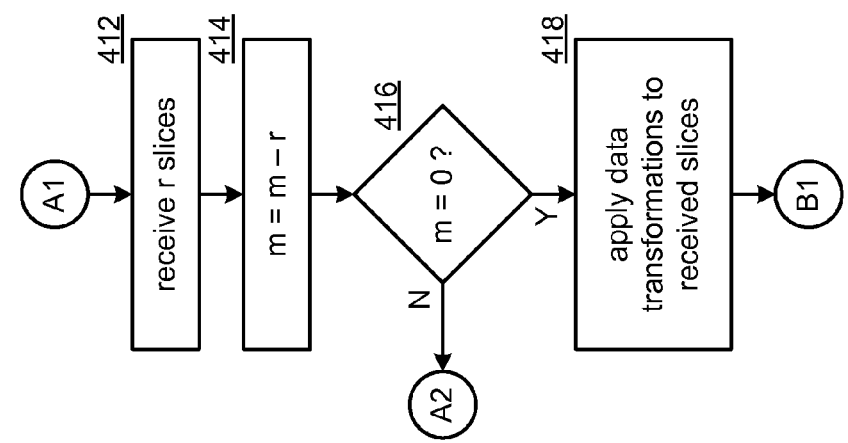
Figure 4A:
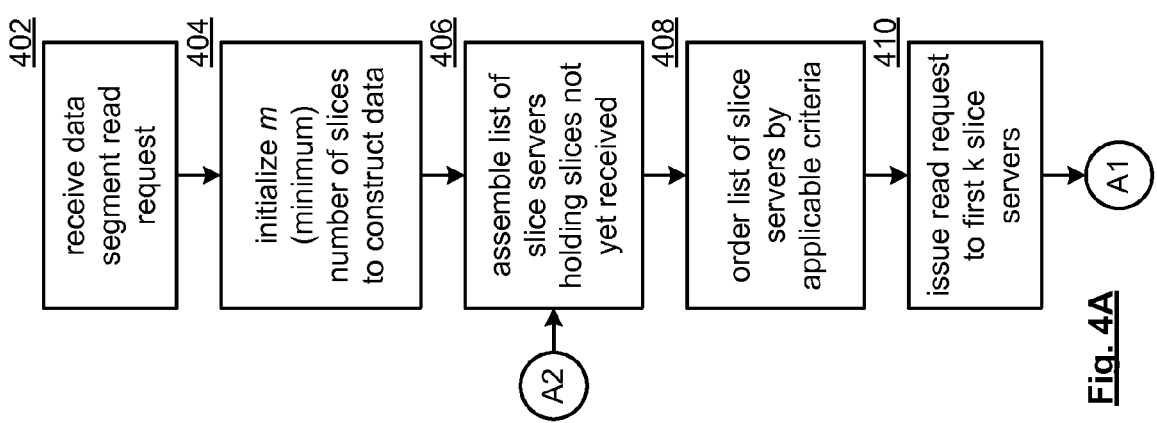

FIGS. 4A-4C show the process by which a dispersed data storage network, constructed in accordance with the disclosed invention and used in conjunction with the process depicted in FIG. 3, could fulfill a read request. In step 402, a read request is received. Contained within the read request will be information sufficient to determine which slice servers contain applicable data, as well as the minimum number of data slices that must be retrieved before the requested data can be reconstructed. Further information on one method that can be used to associate data requests with particular slice servers is contained in U.S. patent application Ser. No. 11/973,621, entitled "Virtualized Data Storage Vaults On a Dispersed Data Storage Network," filed on Oct. 9, 2007 and assigned to Cleversafe, Inc. In step 404, the variable m is initialized to the minimum number of slices required to construct the requested data segment. As described herein, for each successfully received and validated slice, m is decremented.

In step 406, a list of slice servers, each holding a required data slice that has yet to be received, is assembled. In step 408, the list is ordered by any applicable criteria. Further information on criteria by which the list may be ordered is contained in U.S. patent application Ser. No. 11/973,622, entitled "Smart Access to a Dispersed Data Storage Network," filed on Oct. 9, 2007 and assigned to Cleversafe, Inc. In step 410, read requests are issued to the first k slice servers on the assembled list, where k is at least equal to m, the minimum number of data slices needed to reconstruct the requested data segment, but could be as large as n, the number of data slices that have data relevant to the requested data segment. In step 412, r data slices are received, and in step 414 the number of received data slices r is subtracted from the variable m. In step 416, m is compared to zero, and if m is greater than or equal to zero, execution returns to step 406 and proceeds as normal from there. However, if m is equal to zero, a collection of data transformations may optionally be applied to the received slices in step 418. The applied data transformations can include decryption, decompression, and integrity checking In accordance with the disclosed invention, each data slice includes a cyclical redundancy check ("CRC"), or other form of checksum appended to the data contained in the slice. This checksum will be compared against a checksum calculated by the receiving slice server over the received data to ensure that the data was not corrupted during the transmission process.

In step 420, it is determined if the applied data transformations were successful for all of the received data slices. If the applied data transformations were not successful for some of the received slices, m is incremented by this number in step 422, and execution is resumed at step 406. The data transformations could fail, for example, if an integrity check revealed that a received data slice was corrupted. However, if the applied data transformations were successful for all received data slices, the received slices are assembled into the requested block of data in step 424. The same or different data transformations may optionally be applied to the assembled data block in step 426. Step 428 [not on figure]illustrates that the read process is completed. In accordance with the disclosed invention, a checksum for the data segment will be calculated and compared to a checksum appended to the assembled data segment.

Figure 5B:
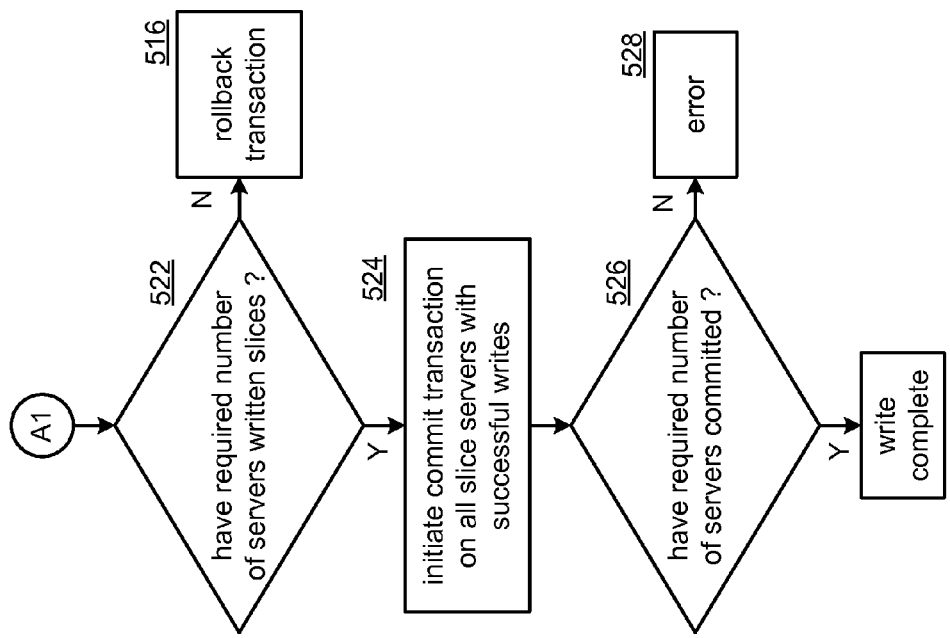
FIGS. 5A-5B collectively illustrate a write operation from a dispersed data storage network constructed in accordance with an embodiment of the disclosed invention.
Figure 5A:
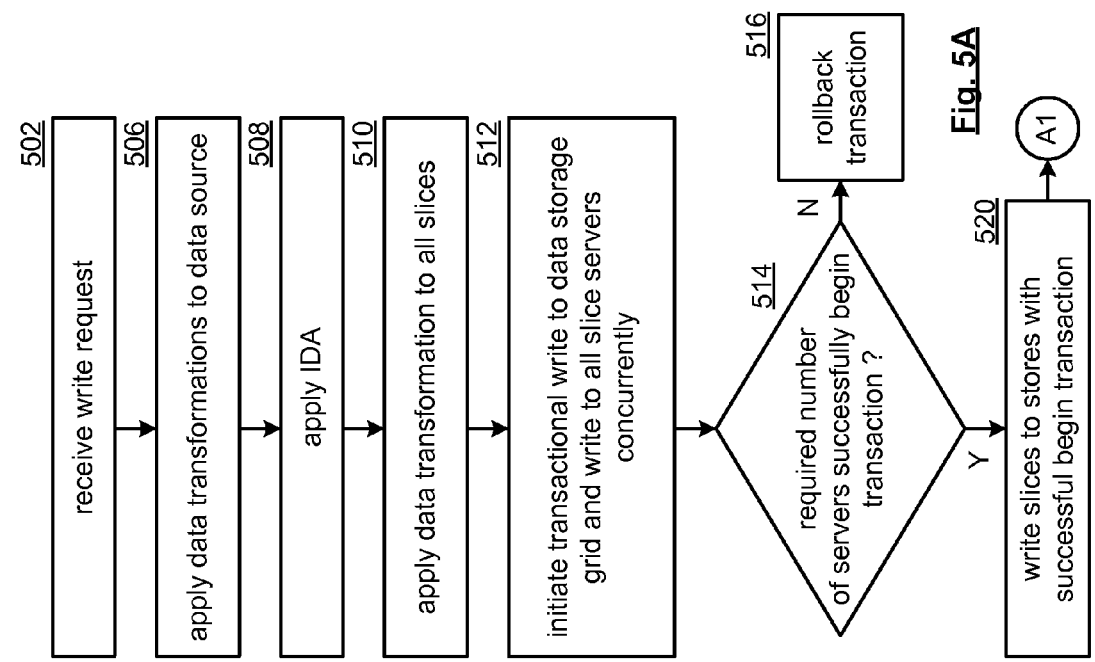

In FIGS. 5A-5B, the process by which a dispersed data storage network, constructed in accordance with the disclosed invention, could write data to a network of slice servers is depicted. In step 502, a data segment write request is received. Included in this write request is information sufficient to determine which slice servers the data segment should be written to, as well as information required by the information dispersal algorithm to divide the data segment, i.e., the number of slices to be written, referred to as n, as well as the minimum number of slices that are required to recover the data, referred to as m. Further information on one method that can be used to associate data writes with particular slice servers is contained in U.S. patent application Ser. No. 11/973,621, titled "Virtualized Data Storage Vaults On A Dispersed Data Storage Network," filed on Oct. 9, 2007 and assigned to Cleversafe, Inc.

A number of data transformations may optionally be applied to each block in step 506, and an information dispersal algorithm is applied in step 508. In particular, the Cauchy Reed-Solomon dispersal algorithm could be applied to the data segment, resulting in a predetermined number of data slices. In step 510, a number of data transformations are optionally applied to each data slice.

In the disclosed system, writes are performed transactionally, meaning that a minimum number of data slices t must be successfully written before a write is deemed complete. Normally, the number of data slices that must be successfully written will be set to the minimum number of slices needed to recreate the data. However, this number can be configured to a greater number, up to the number of slice servers in use. This would allow the user to continue using the dispersed data storage network during a minor network outage where one or more slice servers are unavailable. Slices that could not be immediately transmitted and stored could be queued and transmitted when the network outage cleared. In addition, when a data segment is written to the dispersed data storage network, a transaction identifier is assigned and stored along with each written data slice. As explained later, this transaction identifier is used to ensure that the most recent version of a data segment has been stored to the dispersed data storage network. In step 512, a write transaction is initiated to the data storage network. As discussed herein, all slice servers are simultaneously contacted, and in step 514, a confirmation that at least t receiving slice servers are prepared to begin the write transaction, i.e., to store each slice, must be received, or the transaction is rolled back in step 516.

In step 520 data slices are transmitted to the slice servers that indicated their ability to receive and store slices. The number of slice servers that successfully received and stored their assigned data slices is checked in step 522, and if less than t slices are successfully stored, the transaction is rolled back in step 516. If the result of step 522 is that the stores are successful, then a commit transaction is initiated in step 524 on all servers with successful writes. The required number of servers committed is verified in step 526. If the commit transaction fails, an error is logged in step 528. Otherwise, the write transaction was successful.

Figure 6B:
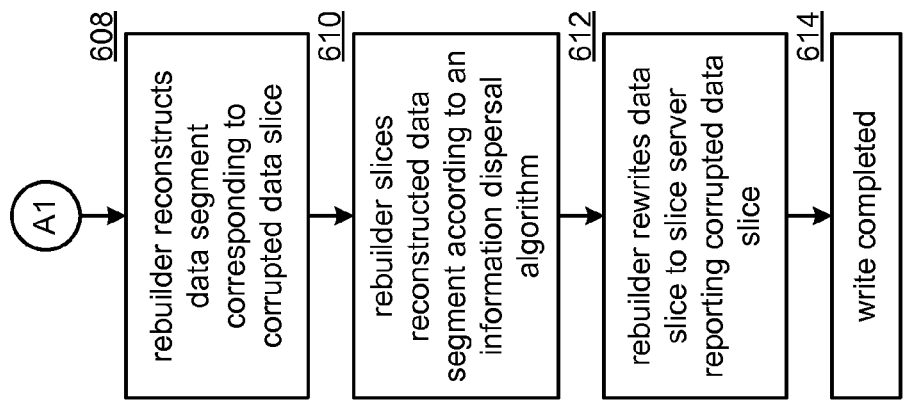
FIGS. 6A-6B collectively illustrate an automated process by which corrupted data slices may be recreated in accordance with an embodiment of the disclosed invention.
Figure 6A:
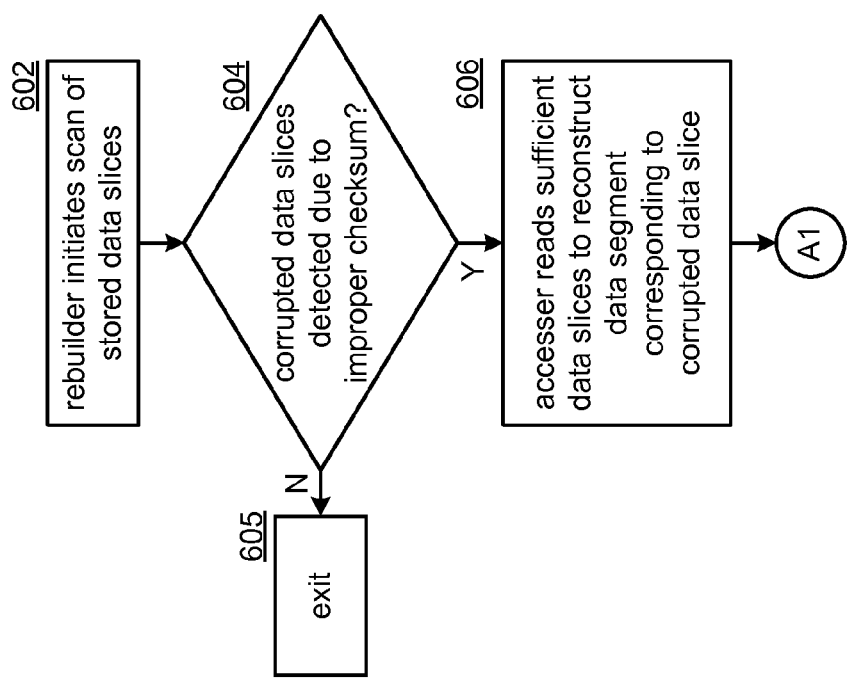

FIGS. 6A-6B are a flow chart illustrating an alternative process by which corrupted data slices may be recreated. In step 602, a scan of data slices is initiated by a rebuilder application operating somewhere on the dispersed data storage network, such as the grid access computer, the monitor appliance, or one or more slice servers. If no corrupted data slice is found at step 604, the corrupted slice recreation process is exited in step 605. However, if a corrupted slice is detected because of a failed integrity check, execution proceeds to step 606, where the rebuilder application determines what data segment corresponds to the corrupted data slice, and reads that data segment from the dispersed data storage network. The rebuilder application then reconstructs the data segment in step 608. In step 610, the data segment is re-sliced, and the rebuilder application rewrites a non-corrupted version of the corrupted data slice to the appropriate slice server in step 612. The process exits after the write has been completed.

The rebuilder application is responsible for ensuring that the integrity of all stored data segments is maintained. As such, the rebuilder application has access to a data store identifying every data segment stored by the dispersed data storage network. Note that referring to the rebuilder application as singular is solely for convenience; a system implementing the disclosed invention could be constructed using multiple rebuilder applications, each responsible for maintaining some subset of the stored data segments.

Figure 7:
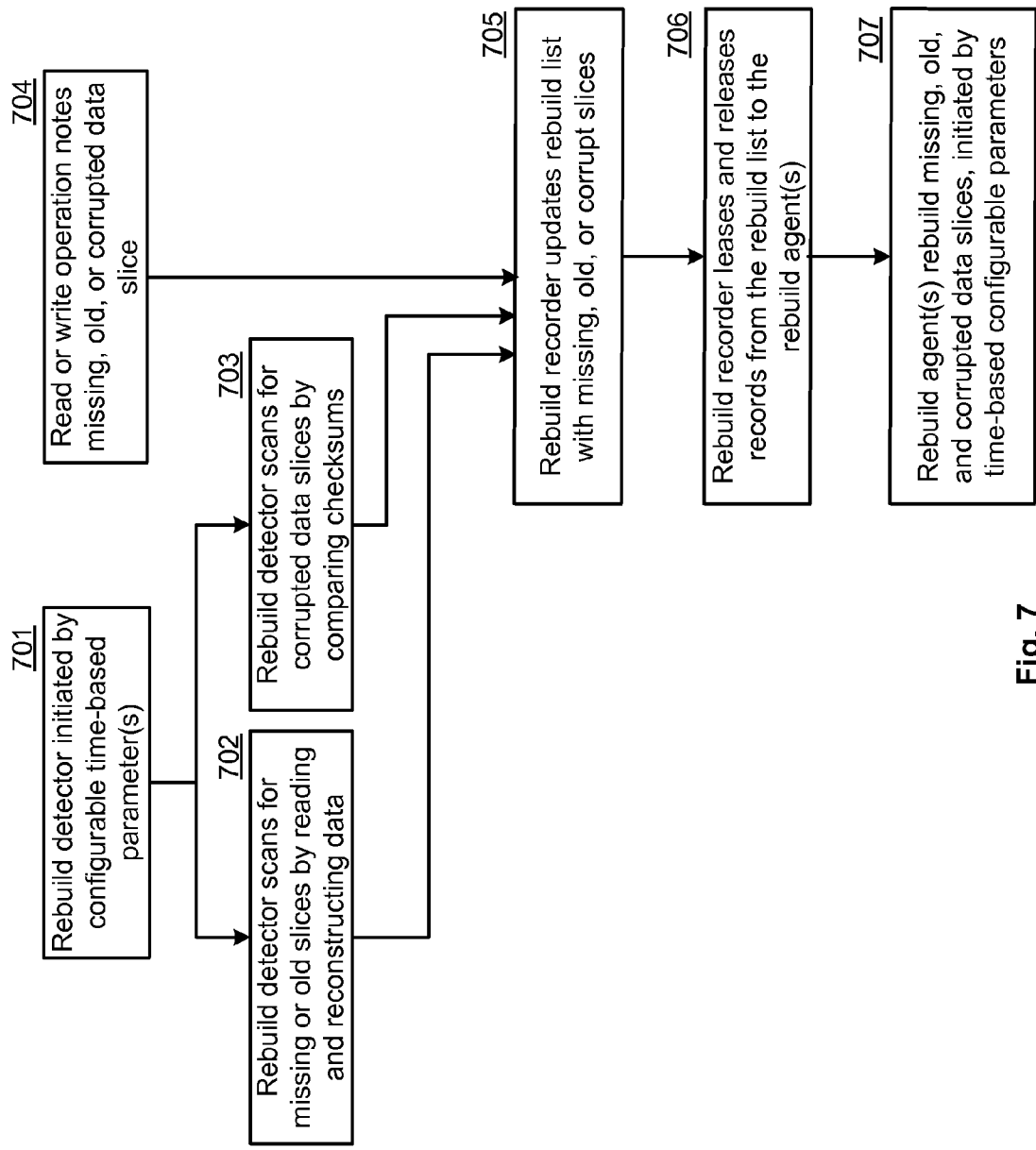
FIG. 7 is a flowchart illustrating the high-level operation of a rebuild process in accordance with an embodiment of the disclosed invention.

FIG. 7 illustrates the high-level operation of the rebuild process, and in particular, the interactions of the following components of the rebuilder application: the rebuild agent, the rebuild recorder, and the rebuild detector.

The rebuild agent executes rebuild operations. In order to rebuild a data segment, the following operations are performed: 1) some or all of the available data slices for that data segment are read; 2) information dispersal algorithms are used to obtain a pre-dispersal form of the data segment; 3) information dispersal algorithms are used to generate restored versions of the previously missing/corrupted data slices; and 4) the restored data slices are written to the appropriate slice servers. When performing slice write operations, the rebuild agent will indicate the transaction identifier of the slices being written. The slice servers will use this identifier to ensure that slices are not overwritten if their transaction identifiers are greater than those specified.

Figure 13:
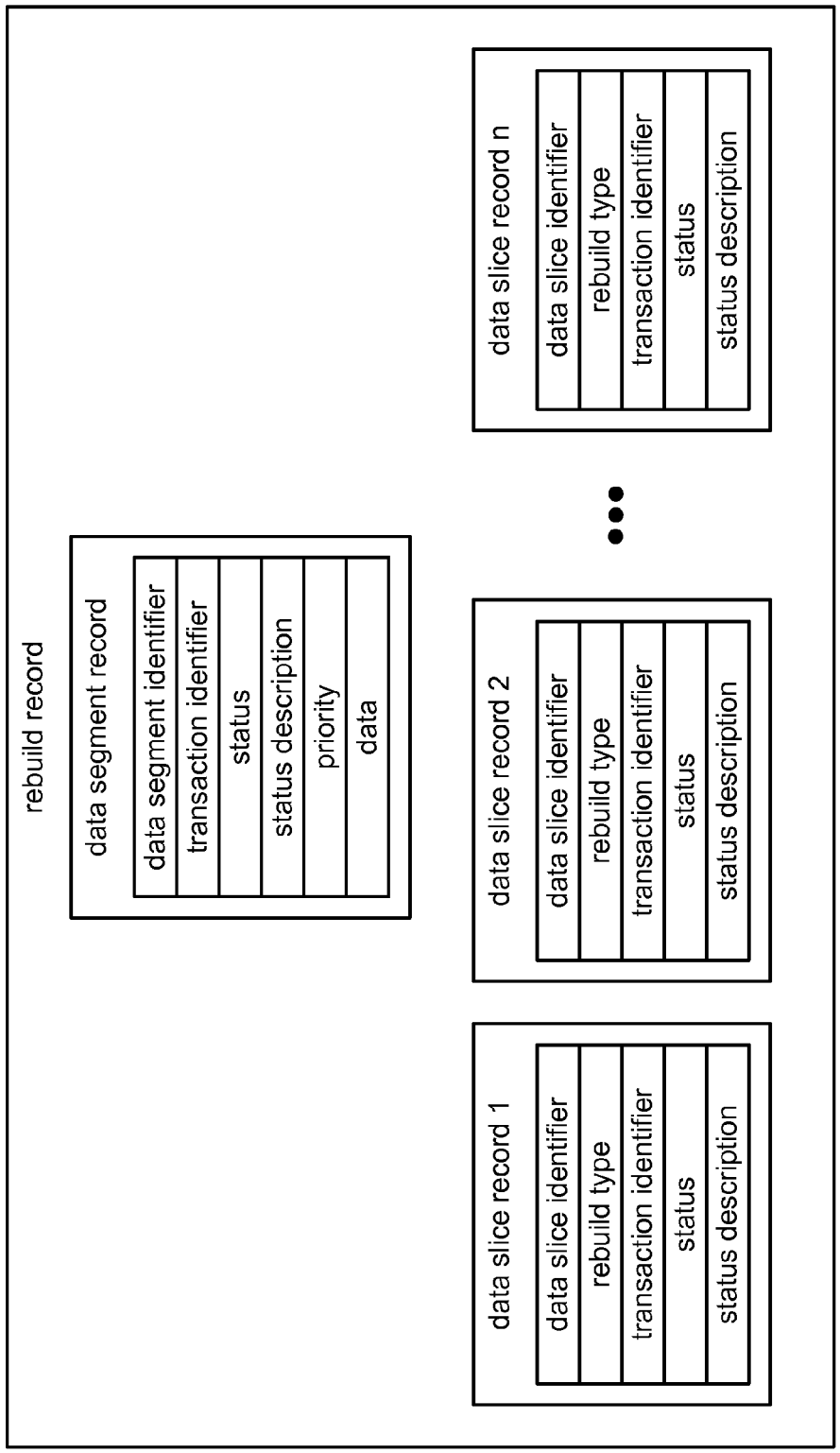
FIG. 13 is an example layout of a rebuild record, which stores the identities and other information used to manage the record of data slices that need to be rebuilt.

The rebuild recorder stores information about data segments that have been identified as potentially needing to be rebuilt. This information is represented using "RebuildRecords." A RebuildRecord consists of an identifier associated with the data segment to be rebuilt, the transaction identifier associated with the data segment to be rebuilt, and the identifiers of the data slices that are associated with the data segment to be rebuilt. The rebuild recorder is responsible for providing rebuild records to rebuild agents, which actually perform the rebuilding operation. FIG. 13 depicts one possible implementation of a RebuildRecord. Each RebuildRecord will include one data segment record, which may include a data segment identifier, a transaction identifier, the status of any rebuild operation, a status description for any rebuild operation, the priority of any rebuild operation, and any other data associated with the data segment to be rebuilt. Each RebuildRecord will also include one or more data slice records, which may include a data slice identifier, the type of rebuild operation, a transaction identifier, the status of the rebuild operation, and a status description of the rebuild operation. The transaction identifier indicates the transaction on which the data segment or data slice was stored. Status indicates the progress of the rebuild operation; for example, PENDING, ACTIVE, COMPLETE, or FAILED. Rebuild type indicates how a particular data slice was compromised; for example, MISSING, OUTDATED, CORRUPTED, or UNKNOWN.

The rebuild detector actively discovers data slices that have been compromised in some way. For example, the rebuild detector is able to detect missing and outdated slices by downloading a list of slices from each slice server and comparing those lists. The rebuild detector can also detect corrupted data slices by verifying the checksums of all data slices. This executes on each slice server in parallel.

In addition, the activities of the rebuild detector, recorder, and rebuild agent generate statistics that are useful in monitoring the health of the dispersed data storage network. Examples of such statistics are number of RebuildRecords in the list, the time it takes to rebuild one slice, or the number of slices being rebuilt per second. These statistics can then be viewed on the manager appliance, or other similar monitoring agent.

In step 701, the rebuild detector is triggered by some mechanism, such as the expiration of a timer based on configurable parameters related to frequency of rebuild, idle time in relation to other operations, and other parameters. The rebuild detector utilizes two separate types of scans.

In step 702, the rebuild detector scans by attempting to read and reconstruct each data segment from its constituent data slices. During the scanning process, the rebuild detector may notice that a particular data segment has data slices with different transaction identifiers, indicating that one or more of the data slices were not updated during a write, and therefore, that multiple versions of the same data segment are stored. The data slices with outdated transaction identifiers will be identified as compromised. It may also discover missing data slices. If it notes that a particular data slice in a data segment is missing or outdated, it passes the data slice to the rebuild recorder in step 705.

In step 703, the rebuild detector scans by looking directly at the slices on the slice servers, computing new checksums, and comparing to the stored checksum. If the computed checksum for a particular data slice does not match the checksum appended to the data slice, the identifying information for the data slice will be passed to the rebuild recorder in step 705.

In step 704, during normal read operations, if a missing, outdated, or corrupted data slice is read, the data slice identifier corresponding to the compromised data slice is passed to the rebuild recorder in step 705. In addition, during normal write operations, if a data segment cannot be written to all of the slice servers, the data slices that were not written are passed to the rebuild recorder in step 705.

In step 705, the rebuild recorder generates the necessary data and forms or updates a RebuildRecord, which is appended to the rebuild list, based on the compromised data slices it has identified. In step 706, the rebuild recorder leases records from the list to a rebuild agent, which in step 707 rebuilds the data. The rebuilding of the data is done by reading enough slices to reconstitute a data segment, re-slicing the data segment, and storing the needed slices, resulting in a complete and correct data segment.

Concerning the operation of the rebuild agent or agents, a single rebuild agent could handle all data slice rebuilding for a rebuilder application. Alternatively, a new process or thread could be created for each data slice to be rebuilt. In yet another alternative, a fixed stable of rebuild processes or threads could be spawned or instantiated when the rebuilder application was executed and rebuild records would then be passed to available rebuild agents as they finished rebuilding a compromised data slice.

FIG. 8 depicts a normal read operation from a dispersed data storage network, illustrating in particular the process by which corrupted slices may be discovered during the read. During the read operation, an access device requests a slice from a slice server in step 802. In step 803, the slice server transmits the requested slice to the access device, which calculates a checksum for the requested data slice. In step 804, the calculated checksum is compared to the checksum appended to the stored data slice, and if the two checksums match, the read proceeds as normal in step 806. However, if the two checksums do not match, the read operation will pass a message to the rebuilder application operating on the dispersed data storage network indicating that the requested data slice is corrupted in step 808. The rebuild recorder in step 809 inserts a RebuildRecord with the requested data slice's data slice identifier and an indication that the requested data slice is corrupted into its rebuild list so the identified data slice may rebuild. In step 810, the grid access computer determines if an alternative slice can be read from a different slice server. If an alternative slice does not exist, the grid access computer will report an error in step 812. In step 814, the grid access computer reads the alternative slice.

Figure 9:
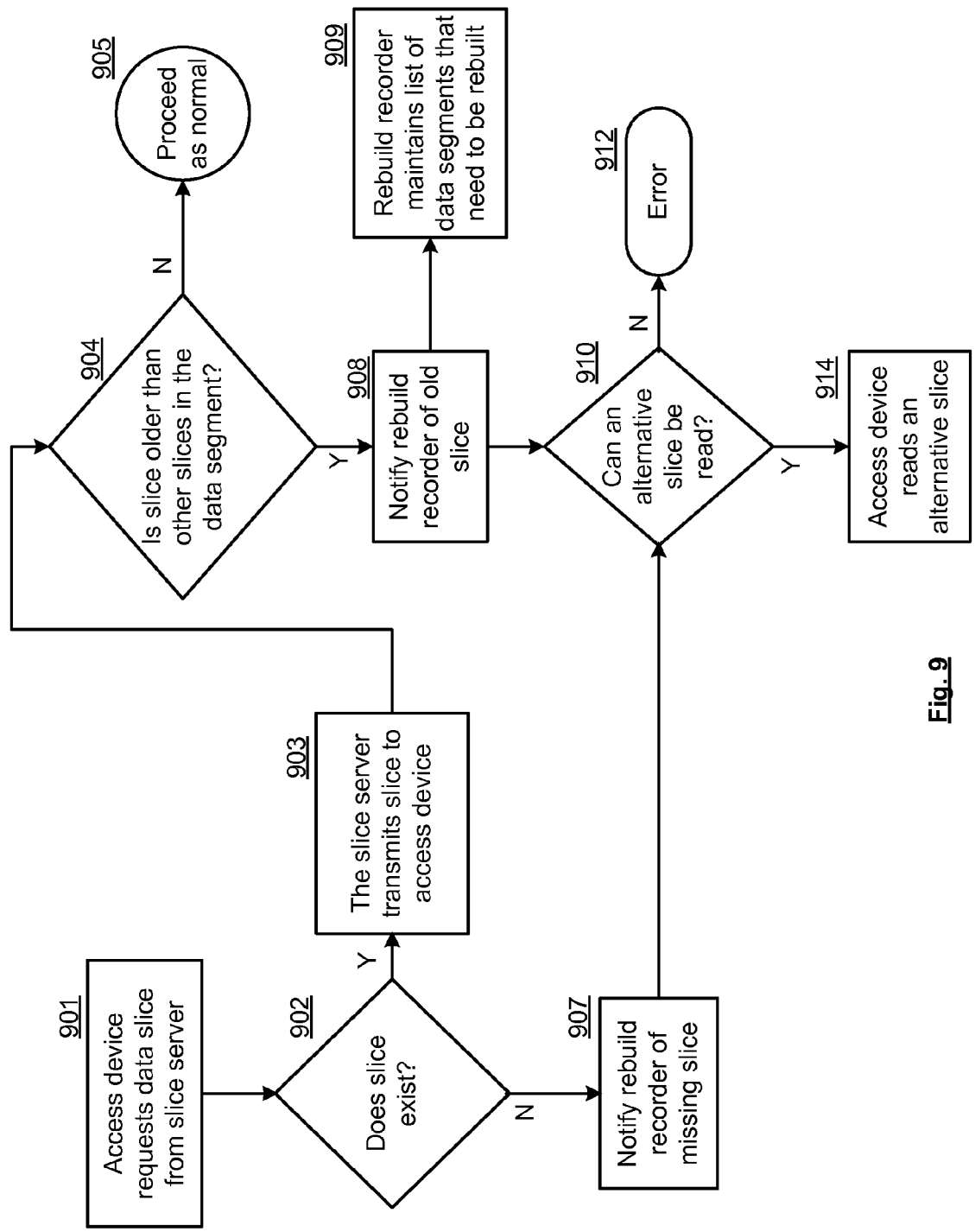
FIG. 9 is a flowchart illustrating a process for discovery of missing or outdated slices during the course of a normal read operation, in accordance with an embodiment of the disclosed invention.

FIG. 9 depicts a normal read operation from a dispersed data storage network, illustrating in particular the process by which missing and outdated slices may be discovered. During the read operation, an access device requests a data slice from a slice server in step 901. In step 902, the data slice server returns the data slice or an error indicating that the requested data slice does not exist. If the requested data slice does not exist, in step 907 the rebuilder application is notified of the missing slice. Otherwise, in step 903, the slice server transmits the requested slice to the access device. In step 904, the transaction identifier of the data slice that was read is compared to the transaction identifiers of the other data slices that make up the data segment. If the transaction identifier matches the most recent transaction identifier of the other data slices used to reconstruct the data segment, the read proceeds as normal in step 905. However, if the transaction identifiers do not match, the read operation will pass a message to the rebuilder application operating on the dispersed data storage network indicating that the requested data slice is too old in step 908. The rebuild recorder in step 909 inserts or updates a RebuildRecord with the data slice identifier corresponding to the outdated or missing data slice into its rebuild list so that the outdated or missing data slice may be rebuilt. In step 910, the grid access computer determines if an alternative data slice can be read from a different slice server. If an alternative data slice does not exist, the grid access computer will report an error in step 912. In step 914, the grid access computer reads the alternative data slice.

Figure 10:
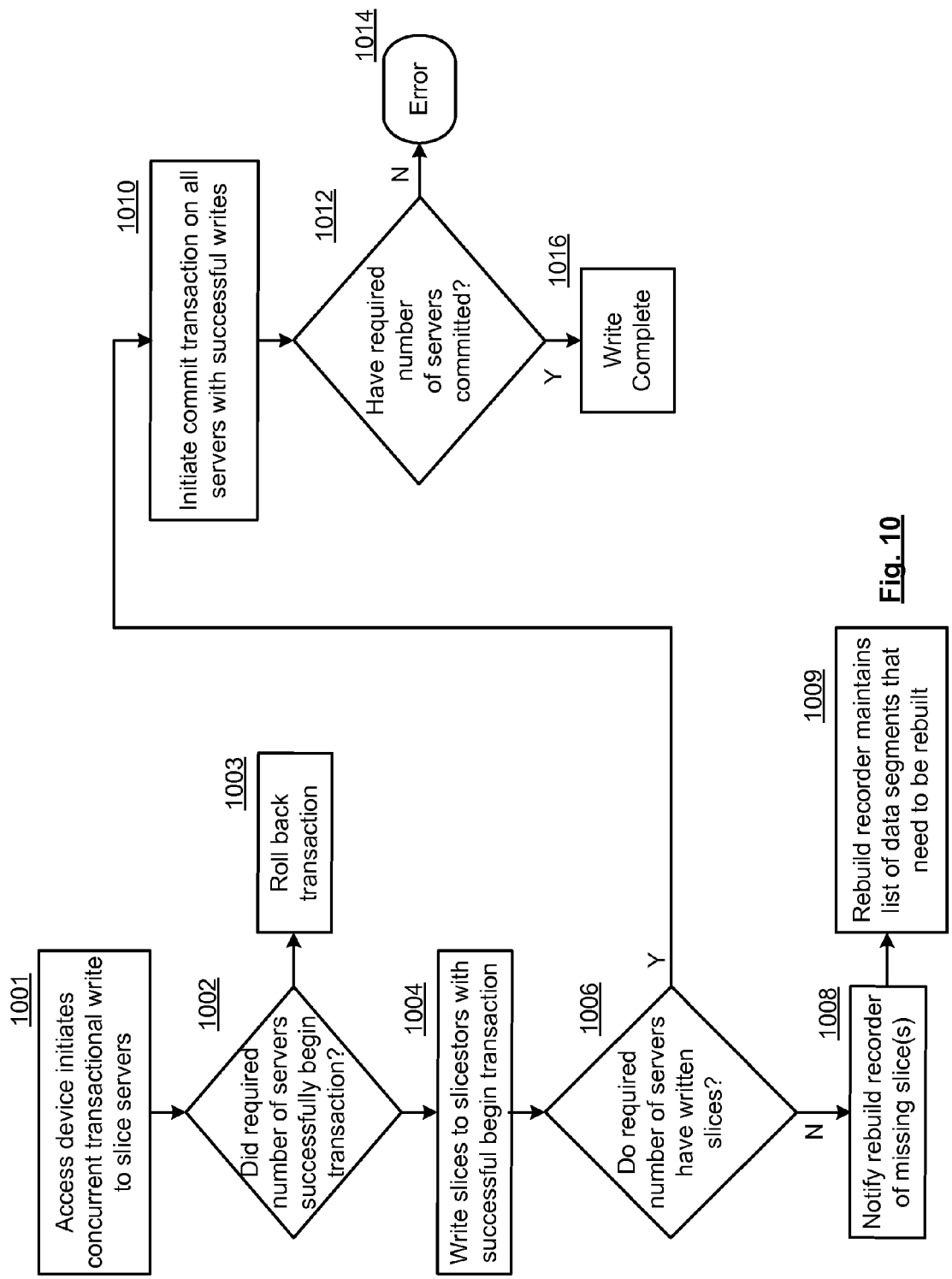
FIG. 10 is a flowchart illustrating a process for discovery of missing slices during the course of a normal write operation, in accordance with an embodiment of the disclosed invention.

FIG. 10 depicts a normal write operation to a dispersed data storage network, illustrating in particular the process by which missing slices may be recorded during this process. In step 1001, the normal write process begins, initiating concurrent transactional writes to the slice servers of all the data slices associated with a data segment. If the minimum required number of slice servers cannot be successfully written in step 1002, [Step 1002 might need N or Y on arrows pointing to 1003 and 1004 to make clear] then in step 1003, the write transaction is rolled back. If, on the other hand, the minimum required number of slice servers is available, the data slices are written to the available slice servers. If the required number of data slices were written in step 1006, then a commit transaction is initiated in step 1010. If the commit succeeds on the required number of slice servers in step 1012 then the write is successful; otherwise, a write error is returned to the calling program in step 1014.

Step 1008 illustrates that if the write operation has determined that some number of slice servers was not able to write a data slice for a data segment, then the rebuild recorder is notified in step 1008 so that the missing data slices may be written in the future. In step 1009, the rebuild recorder inserts or updates a RebuildRecord for each missing data slice into its rebuild list so that the missing data slices can be "rebuilt" at a later time.

Figure 11:
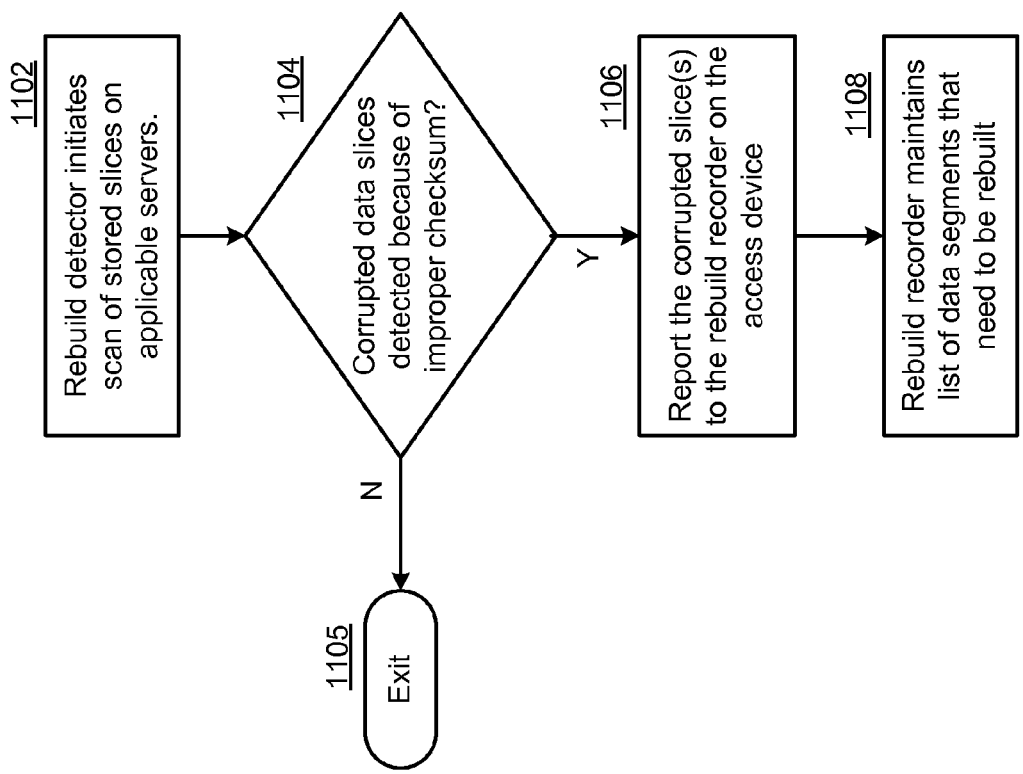
FIG. 11 is a flowchart illustrating a data scan that detects corrupt data slices, in accordance with an embodiment of the disclosed invention.

FIG. 11 is a flow chart illustrating one of the scans performed by the rebuild detector, namely the scan for corrupted data slices. In step 1102, a scan of data slices held by each slice server is initiated by a rebuilder application operating somewhere on the dispersed data storage network. Once initiated, each slice server scans its own data slices by calculating a new checksum for each slice and comparing that checksum to the checksum appended to the stored data slice. If no corrupted data slice is found in step 1104, the corrupted slice detection process is exited in step 1105. However, if a corrupted slice is detected because of a failed integrity check, execution proceeds to step 1106, where the rebuild detector determines what data segment corresponds to the corrupted data slice, and reports that information to the rebuild recorder. In step 1108, the rebuild recorder inserts or updates a Rebuild Record including the corrupted data slice's information into its rebuild list.

Figure 12:
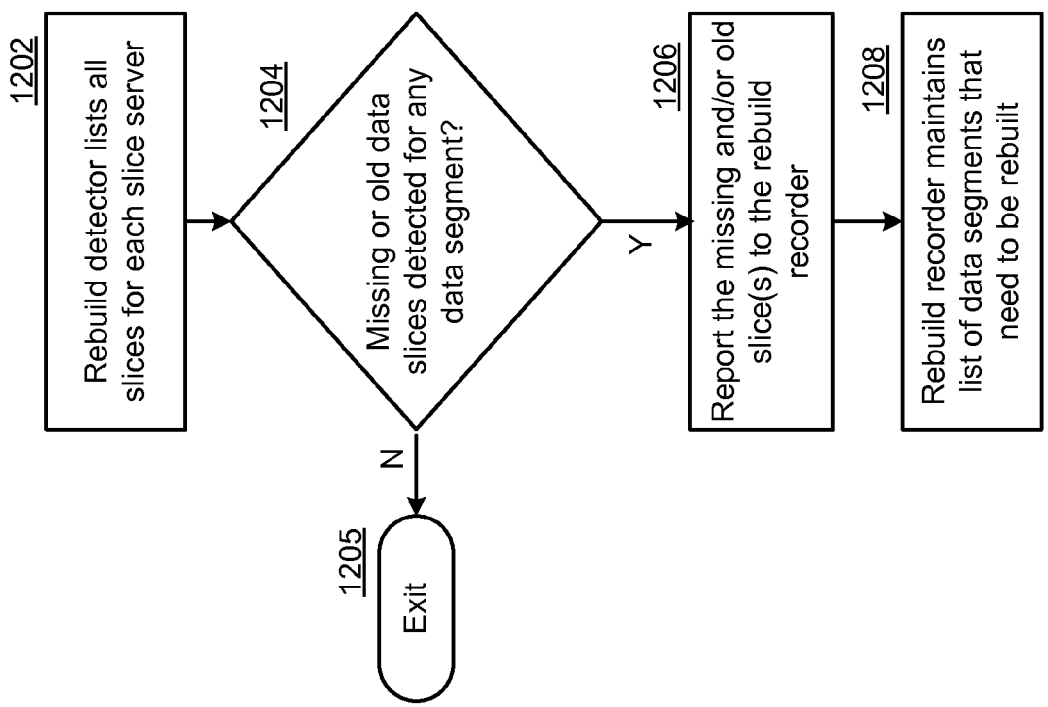
FIG. 12 is a flowchart illustrating a data scan that detects missing and outdated data slices, in accordance with an embodiment of the disclosed invention.

FIG. 12 is a flow chart illustrating the other scan performed by the rebuild detector, namely the scan for missing or outdated data slices. In step 1202, a scan of data slices is initiated by a rebuilder application operating somewhere on the dispersed data storage network. The rebuild detector asks each slice server for a list of the data slices contained on that server. In step 1204, the separate lists are processed in tandem with each other so that data slices from each data segment can be compared. If no missing or outdated data slice is found in step 1204, the missing or outdated slice detection process is exited in step 1205. However, if a slice is missing or a slice is determined to be older than the other slices in the data segment by comparing the transaction identifiers associated with the data slices, execution proceeds to step 1206, where the rebuilder application reports information necessary to identify any outdated or missing data slices to the rebuild recorder. In step 1208, the rebuild recorder inserts or updates Rebuild Records corresponding to the missing or outdated data slices into its rebuild list so that the identified data slices may be rebuilt.

FIG. 13 shows an example Rebuild Record, containing the data used to record data slices that need to be rebuilt.

Figure 14:
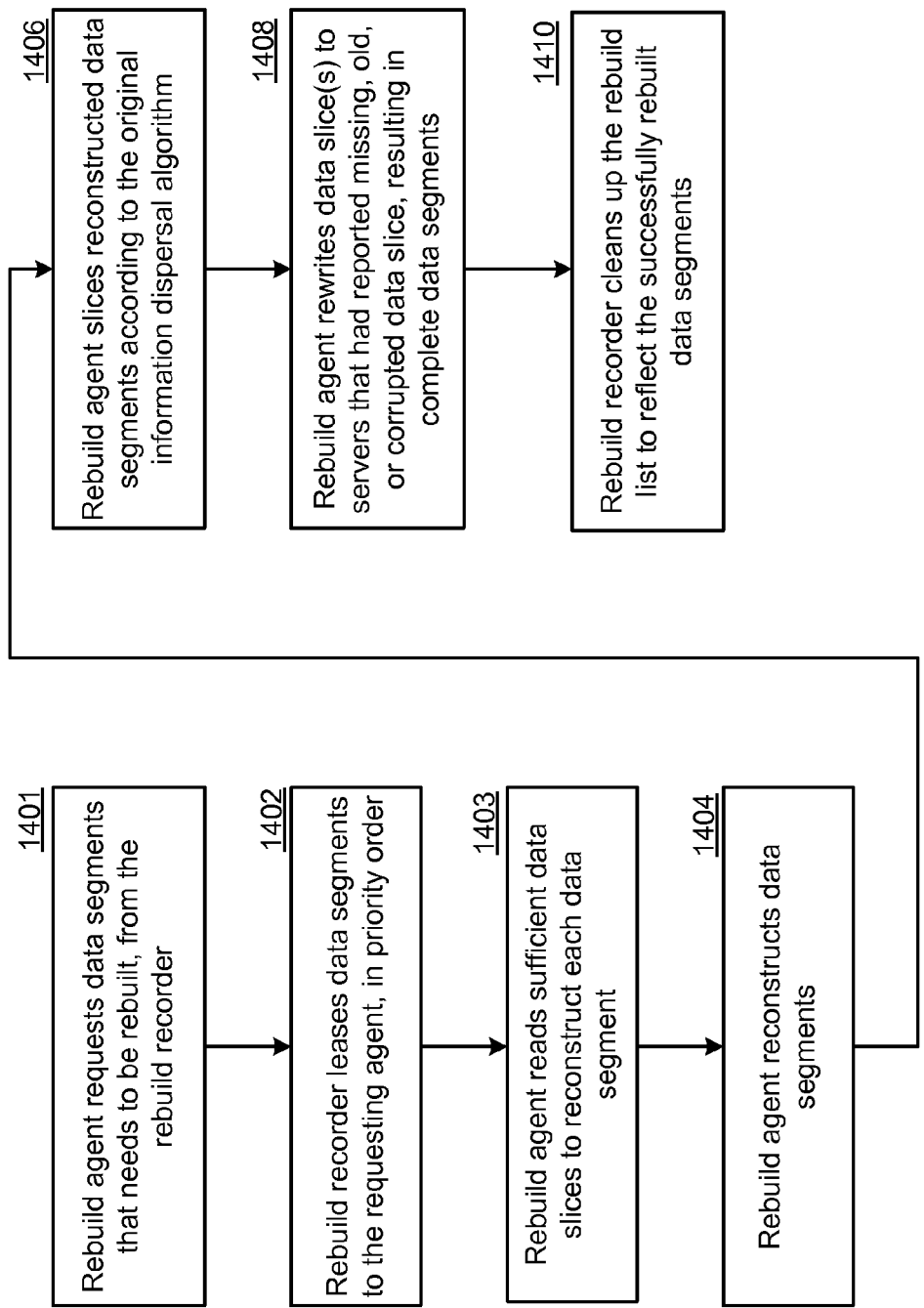
FIG. 14 is a flowchart illustrating a process that rebuilds missing, outdated, or corrupt data slices, in accordance with an embodiment of the disclosed invention.

FIG. 14 illustrates the rebuilding of missing, outdated, or corrupt data slices which were detected and recorded in the preceding processes. The rebuild agent is responsible for this activity. In step 1401 a rebuild agent is initiated by a configurable time-based trigger, and requests data segments that need to be rebuilt from the rebuild recorder. In step 1402 the rebuild recorder responds with said data segments, if any exist. The data segments are prioritized, with the segments with the most compromised slices being sent first. For each data segment sent, in step 1403 the rebuild agent reads sufficient data slices from the slice servers to reconstruct the data segment. It then reconstructs the data segment in step 1404, and re-slices it in step 1406. Since the same information dispersal algorithm is used, the missing, outdated, or corrupt slices are recreated exactly as they were or would have been originally. In step 1408, the missing, outdated, or corrupt data slices are written to the appropriate slice servers. When this is complete, the rebuild agent returns the results to the rebuild recorder so the rebuild recorder in step 1410 can make its list up to date. It deletes rebuild records that were successfully rebuilt. It un-leases the records which were not successfully rebuilt so that they will be provided again in the next iteration of the rebuild agent process.

FIG. 15 illustrates the specific operation of the rebuild detector. As depicted, data concerning five data segments has been gathered by the rebuild detector, which actively queries slice servers about data segments which the slice servers store. Table 1 shows the transaction identifier associated with data slices held by three slice servers for five separate data segments. Further, for the depicted system, at least two data slices are required to rebuild a data segment. Rows 1512, 1514, 1516, 1518, and 1520 correspond to the stored data segments, and columns 1502, 1504, and 1506 correspond to the slice servers holding the data slices. For data segment 0, which is depicted by row 1512, the data slices stored by all three slice servers were stored during transaction 100, and therefore, the transaction identifier associated with each data slice is 100. As none of these data slices are outdated or missing, none of these data slices will be noted as compromised. However, in regards to data segment 1, slice servers A and C hold data slices that were written during transaction 99, while slice server B holds no data slice at all. This may have occurred because an extended outage prevented the data slice from being written at all, or the portion of a hard disk holding the data slice may have failed. Accordingly, the data slice that should have been held by slice server B is noted as compromised and added to the rebuild list. It may further be marked as missing as opposed to outdated or corrupted.

Data segment 2, which is represented by row 1516, also has no outdated, missing, or corrupted data slices, and therefore, no entry will be made in the rebuild list corresponding to data segment 2. However, in regards to data segment 3, which is represented by row 1518, the data slice stored by slice server C was stored during transaction 100, while the data slices stored by slice servers A and B were stored during transaction 101. Accordingly, the data slice stored by slice server C is likely outdated, and is added to the rebuild list.

Data segment 4 illustrates a case where a stored data segment cannot necessarily be rebuilt. In this case, the data slice stored by slice server A was stored during transaction 102, while the data slice stored by slice server B was stored during transaction 99. In addition, the data slice held by slice server C has become corrupted. As a minimum of two data slices are required to reconstruct a data segment in this example, and only one fully updated data slice is available, it is possible that data segment 4 may no longer be re-buildable. Nonetheless, as two data slices are available, albeit one of them may be outdated, a rebuild operation will be attempted. As with all rebuilt data segments, after a data segment is reconstructed using the correct information dispersal algorithm, the checksum of the rebuilt data segment is computed and checked against the checksum appended to the data segment. Assuming the checksums match, the data segment is intact, and it will be re-sliced, and the transaction number for each data slice set to the most recent transaction, i.e., 102 in this case.

As illustrated, the process of detecting missing and outdated data slices involves comparing the data slices stored by each slice server. As the number of stored data segments may be extremely large, a complete representation of every stored data slice may be too large to hold in memory. Thus multiple iterations, each producing a partial list of stored data slices, may be required in order to process all stored slices. Such a process would proceed on a data segment by data segment basis, with information about all data slices comprising some number of particular data segments being pulled and analyzed during each iteration.

Figure 16:
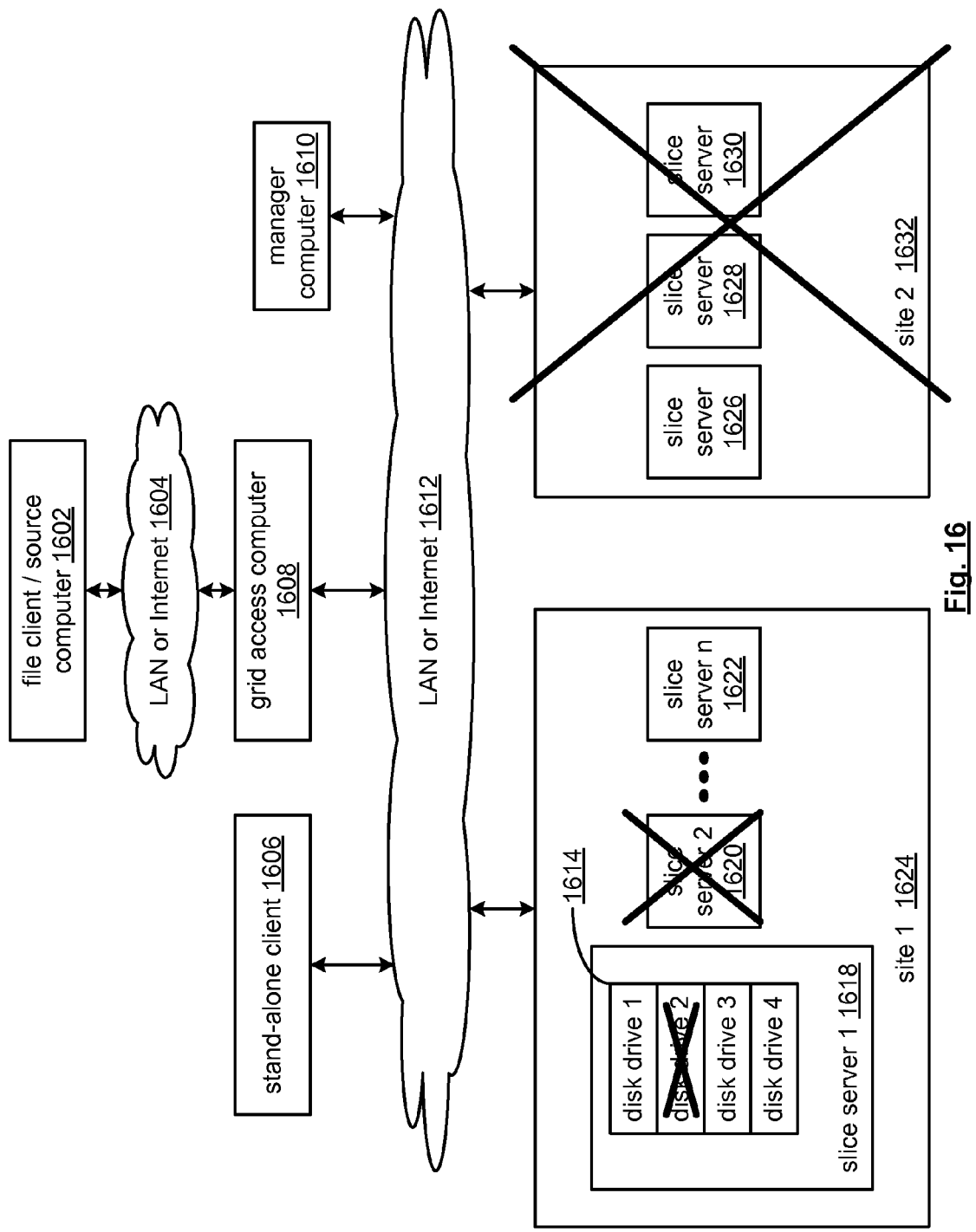
FIG. 16 is a network diagram of a dispersed data storage network constructed in accordance with an embodiment of the disclosed invention.

During operation of a dispersed data storage network an event may occur where a large number of related data slices are simultaneously destroyed, corrupted, or otherwise rendered permanently unusable. Examples of such events are depicted in FIG. 16. FIG. 16 depicts a dispersed data storage network including a number of data storage sites 1624 and 1632 each comprising a number of slice servers. 1602-1612 in figure, not in text For example, data storage site 1624 includes slice servers 1618, 1620, and 1622. In addition, as depicted, each slice server has access to four drives; for example, slice server 1618 has access to four drives labeled disk drive 1 through disk drive 4. Note that these drives could be integrated into the server, or could be external drives accessible via a data connection, such as a USB connection, or a network connection. Furthermore, any number of drives could be accessed by any slice server, and four drives are depicted only for illustrative purposes. It should be noted that each drive potentially holds millions of data slices. In one embodiment of the disclosed invention, each slice is assigned a sequential slice identifier, with a range of data slices being uniquely assigned to a drive; for example, a drive could hold data slices with identifiers 0 through 1,000,000. In a separate embodiment of the disclosed invention, slices stored on a particular drive need not be identified using sequential identifiers. However, a database, which could be stored anywhere within the dispersed data storage network, would relate slice identifiers to slice servers as well as particular disks.

Site 1 1624 depicts two potential scenarios where a large number of related data slices are rendered inaccessible. Slice server 1618 has a number of drives 1614 associated with it. As depicted, four drives are shown associated with slice server 1618. These drives could be incorporated within the server, or merely accessible by the server. Further, the number four is arbitrary, and any reasonable number of drives could accessible by any slice server.

In one possible scenario disk drive 2, which is accessible by slice server 1618, has been rendered inaccessible by an event, such as, for example, drive failure or switching out the drive. In this example, all data slices stored by disk drive 2 are inaccessible, and a rebuilder application operating on the dispersed data storage network is notified of the inaccessibility of the data slices stored on disk drive 2. In a second scenario, slice server 1620 has been rendered permanently inaccessible by an event, such as, for example, an electrical fire. In this scenario, a rebuilder application operating on the dispersed data storage network is notified of the inaccessibility of all data slices stored on the slice server 1620.

FIG. 16 depicts one additional scenario that would render a large number of data slices inaccessible. This additional scenario is the destruction of an entire storage site 1632. In this scenario, a rebuilder application operating on the dispersed data storage network is notified of the inaccessibility of all data slices stored by the storage site 1632. While three potential scenarios rendering a large number of data slices inaccessible are depicted in FIG. 16, these are shown only for illustrative purposes, and should not be construed as limiting the invention in any way.

Figure 17:
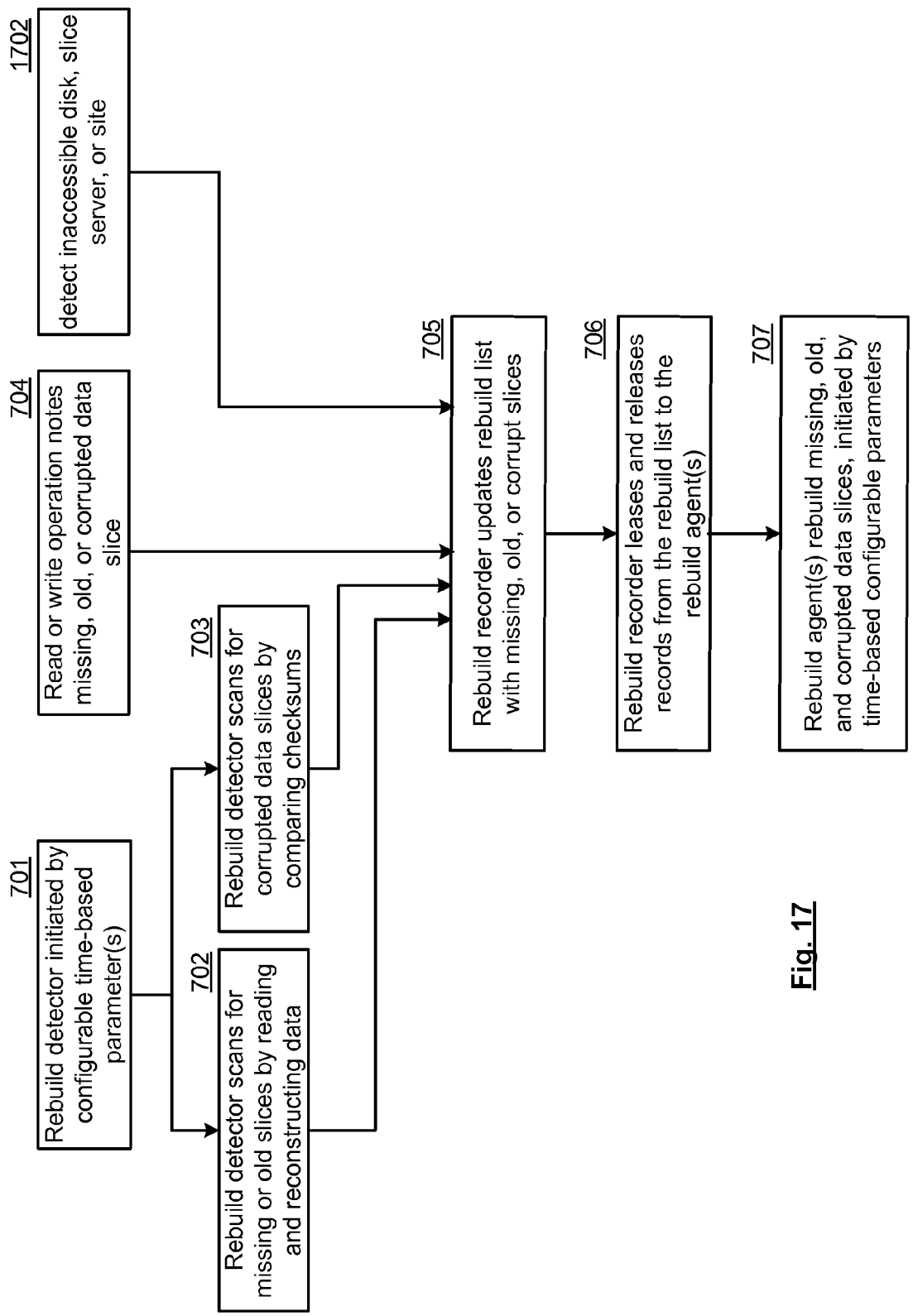
FIG. 17 is a flowchart illustrating the high-level operation of a rebuild process in accordance with an embodiment of the disclosed invention.

FIG. 17 depicts the high-level operation of the rebuilder as optimized in accordance with the disclosed invention. In this embodiment of the disclosed invention, the rebuilder operates identically to the disclosure of FIG. 7, with the addition of step 1702, where an inaccessible disk, slice server, or site is detected. As previously discussed, the disk, slice server, or site could have been destroyed or otherwise compromised so as to render the stored or maintained data slices inaccessible. As in the earlier disclosed version of the rebuilder, identifiers corresponding to the data slices associated with the inaccessible disk, slice server, or site are added to a rebuild list in step 705, and the remainder of the rebuilder's operation is as specified earlier in FIG. 7 and its accompanying text.

Figure 18:
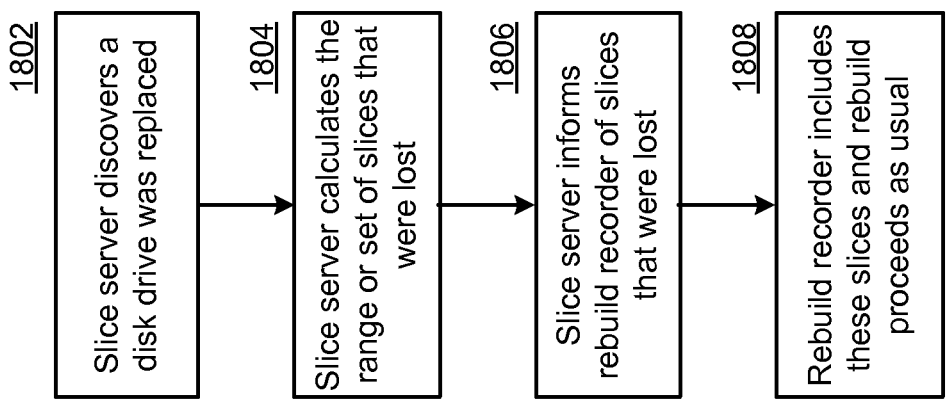
FIG. 18 is a flowchart illustrating the high-level operation of how a disk failure would be detected and the data slices stored by the disk would be rebuilt in accordance with an embodiment of the disclosed invention.

FIG. 18 illustrates the process by which the data slices stored by an inaccessible drive may be captured and added to a rebuild list. In step 1802, a slice server discovers that a disk drive has become inaccessible. The slice server then calculates the range or set of slices that have become inaccessible in step 1804. The slice server generates a message informing the rebuild recorder of the inaccessible slices in step 1806, and in step 1808, the rebuild recorder notes the inaccessible slices and rebuilding proceeds as normal.

Figure 19:
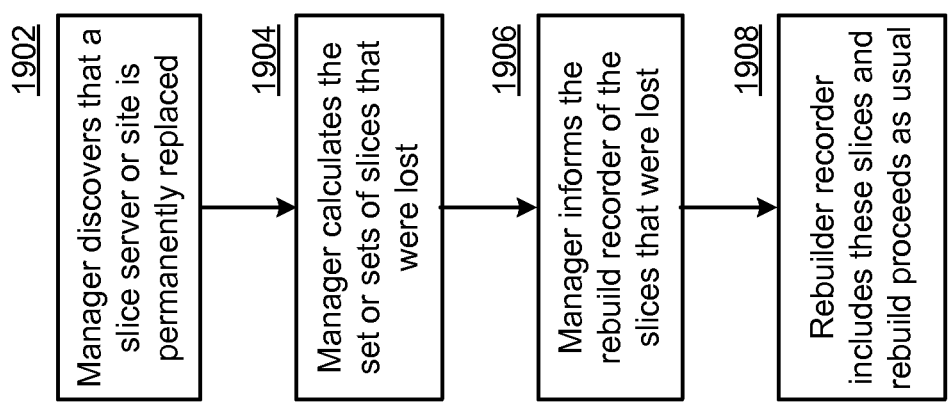
FIG. 19 is a flowchart illustrating the high-level operation of how the destruction of a slice server or an entire site would be detected and the data slices maintained by the slice server or site would be rebuilt in accordance with an embodiment of the disclosed invention.

FIG. 19 illustrates the process by which the data slices stored by an inaccessible site may be captured and added to a rebuild list. In step 1902, a manager or program, such as the rebuild detector, notes that a slice server, multiple slice servers, or an entire site have become inaccessible. In step 1904, the set or sets of slices that were lost are calculated, and in step 1906, the rebuild recorder is informed of the slices that were lost. The rebuild process proceeds as normal in step 1908.

Figure 20:
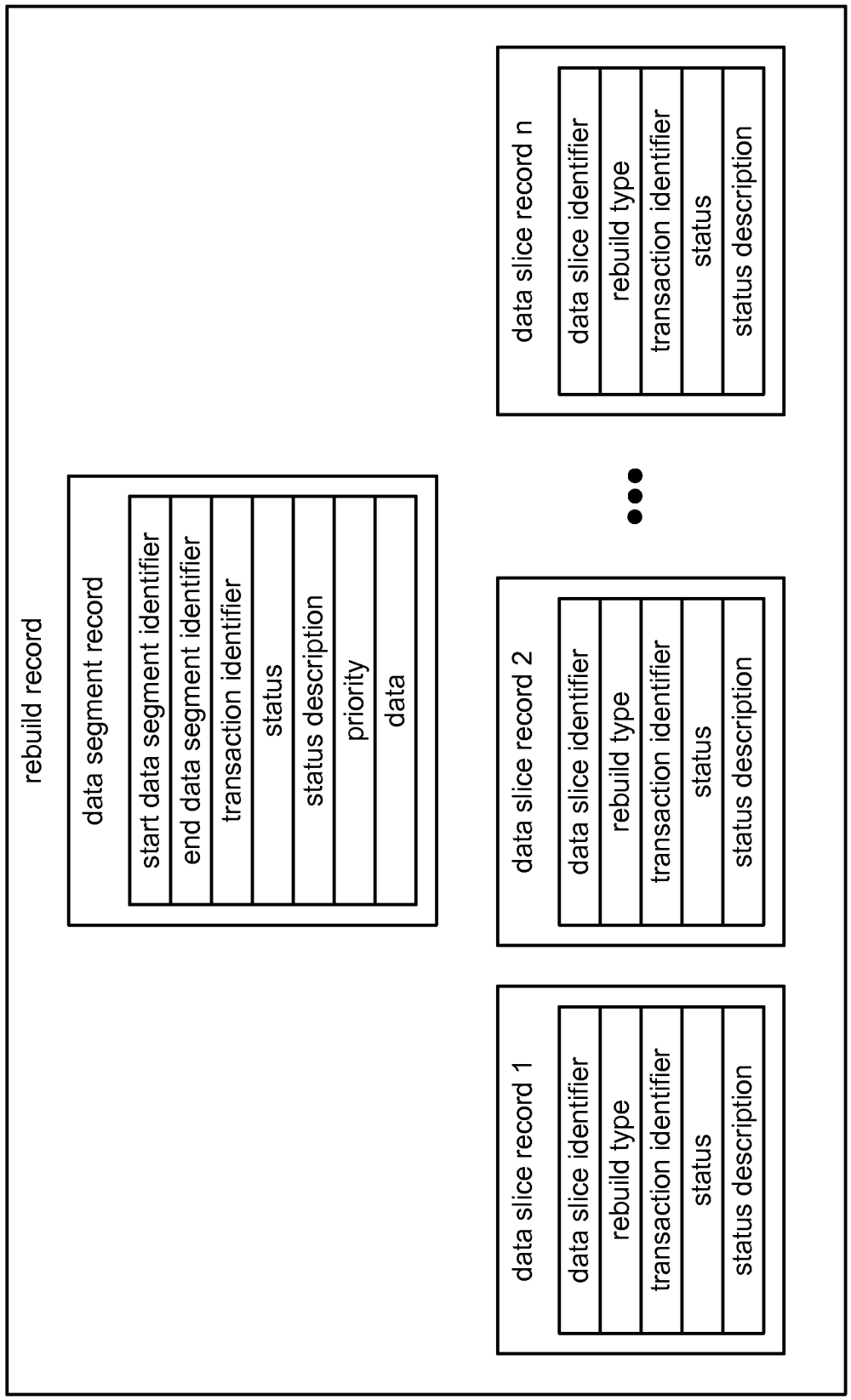
FIG. 20 is an example layout of a rebuilder layout record especially adapted for range based rebuilding.

FIG. 20 illustrates a possible record layout for a rebuild record that represents a range of data segments, instead of one data segment. Such a rebuild record would be assembled from the activities described above, such as, for example, (1) a slice server notifying the rebuilder of one or more unusable slices, (2) a client or grid access computer notifying the rebuilder of one or more unusable slices, or (3) a manager notifying the rebuilder of an incident destroying a slice server or an entire site, along with the warehoused data slices. As noted in FIG. 20, in the illustrated embodiment a rebuild record comprises one data segment record and one or more data slice records, with the data slice records representing the data slices required to assemble the data segment represented by the data segment record. The structure of the rebuild record is identical to that discussed above regarding FIG. 13, with the exception that "start data segment identifier" and "end data segment identifier" are used in place of "data segment identifier" so that a range of data segments can be represented.

The foregoing description of the invention has been presented for purposes of illustration and description, and is not intended to be exhaustive or to limit the invention to the precise form disclosed. The description was selected to best explain the principles of the invention and practical application of these principles to enable others skilled in the art to best utilize the invention in various embodiments and various modifications as are suited to the particular use contemplated. It is intended that the scope of the invention not be limited by the specification, but be defined by the claims set forth below.

What is claimed is:

1. A method for execution by one or more computers associated with a dispersed data storage network, the method comprises:

identifying a data slice requiring rebuilding to produce an identified data slice, wherein the identified data slice is one of a plurality of data slices that constitute a data segment, wherein each of the plurality of data slices is assigned for storage by a corresponding one of a plurality of data slice servers, and wherein data words of the data segment were arranged into a data matrix that is multiplied by an encoding matrix in accordance an information dispersal algorithm to produce a coded matrix of coded values that is arranged into the plurality of data slices;

retrieving at least m number of data slices from at least one of the plurality of data slice servers, wherein n represents the number of data slices in the plurality of data slices and m is less than or equal to n−2;

decoding the retrieved at least m number of data slices by arranging coded values of the retrieved at least m number of data slices into a reconstructed coded matrix and multiplying the reconstructed coded matrix by a decoding matrix in accordance with the information dispersal algorithm to reconstruct the data segment;

encoding the reconstructed data segment by arranging the data words of the reconstructed data segment into the data matrix and multiplying the data matrix by the encoding matrix in accordance with the information dispersal algorithm to produce the coded matrix that is arranged into a new plurality of data slices;

selecting one of the new plurality of data slices as a rebuilt data slices to replace the identified data slice; and writing the rebuilt data slice to the corresponding one of the plurality of data slice servers or to a new slice server.

2. The method of claim 1, wherein the retrieving further comprises:
transmitting a rebuild message to the at least one of the plurality of data slice servers, wherein the rebuild message identifies at least one of:
a corresponding data slice of the plurality of data slices; and
the data segment;
receiving the at least m number of data slices from the at least one of the plurality of data slice servers.

3. The method of claim 1, wherein the writing the rebuilt data slice further comprises at least one of:
transmitting a write command to the corresponding one of the plurality of data slice servers or to the new slice server, wherein the write command instructs the corresponding one of the plurality of data slice servers or to the new slice server to overwrite the identified data slices with the rebuilt data slice; and
transmitting another write command to another one of the plurality of data slice servers, wherein the another write command instructs the other one of the plurality of data slice servers to overwrite a corresponding one of the plurality of data slices with a corresponding one of the plurality of rebuilt data slices.

4. The method of claim 1 further comprises:
updating a transaction identification value of the rebuilt data slice.

5. The method of claim 1 further comprises:
prior to rebuilding the identified data slice, recording the identified data slice to produce a recorded coded slice; and
reconstructing the recorded data slice to produce the rebuilt data slice.

6. The method of claim 1 further comprises:
determining a cause for the identified data slice requiring rebuilding;
when the cause for the identified data slice requiring rebuilding is one of corruption or out-of-date, writing the rebuilt data slice to the corresponding one of the plurality of slice servers assigned to store the identified data slice; and
when the cause for the identified data slice requiring rebuilding is a missing data slice:
writing the rebuild data slice to the new slice server; and
updating the plurality of slice servers to include the new slice server and to remove the slice server corresponding to the identified data slice.

7. A computer for use within a dispersed data storage network, the computer comprises:
a network interface for interfacing with a network, wherein a plurality of data slice servers is operably coupled to the network; and
a central processing unit, wherein the central processing unit is operably coupled to:
identify a data slice requiring rebuilding to produce an identified data slice, wherein the identified data slice is one of a plurality of data slices that constitute a data segment and wherein each of the plurality of data slices is assigned for storage by a corresponding one of a plurality of data slice servers, and wherein data words of the data segment were arranged into a data matrix that is multiplied by an encoding matrix in accordance an information dispersal algorithm to produce a coded matrix of coded values that is arranged into the plurality of data slices;
retrieve at least m number of data slices from at least one of the plurality of data slice servers, wherein n represents the number of data slices in the plurality of data slices and m is less than or equal to n−2;
decode the retrieved at least m number of data slices by arranging coded values of the retrieved at least m number of data slices into a reconstructed coded matrix and multiplying the reconstructed coded matrix by a decoding matrix in accordance with the information dispersal algorithm to reconstruct the data segment;
encode the reconstructed data segment by arranging the data words of the reconstructed data segment into the data matrix and multiplying the data matrix by the encoding matrix in accordance with the information dispersal algorithm to produce the coded matrix that is arranged into a new plurality of data slices;
select one of the new plurality of data slices as a rebuilt data slices to replace the identified data slice; and
write the rebuilt data slice to the corresponding one of the plurality of data slice servers or to a new slice server.

8. The computer of claim 7, wherein the central processing unit further functions to retrieve the at least m number of data slices by:
transmitting, via the network interface, a rebuild message to the at least one of the plurality of data slice servers, wherein the rebuild message identifies at least one of:
a corresponding data slice of the plurality of data slices; and
the data segment;
receiving, via the network interface, the at least m number of data slices from the at least one of the plurality of data slice servers.

9. The computer of claim 7, wherein the central processing unit further functions to the write the rebuilt data slice by at least one of:
transmitting, via the network interface, a write command to the corresponding one of the plurality of data slice servers or to the new slice server, wherein the write command instructs the corresponding one of the plurality of data slice servers or to the new slice server to overwrite the identified data slices with the rebuilt data slice; and
transmitting, via the network interface, another write command to another one of the plurality of data slice servers, wherein the another write command instructs the other one of the plurality of data slice servers to overwrite a corresponding one of the plurality of data slices with a corresponding one of the plurality of rebuilt data slices.

10. The computer of claim 7, wherein the central processing unit further functions to:
update a transaction identification value of the rebuilt data slice.

11. The computer of claim 7, wherein the central processing unit further functions to:
- determine a cause for the identified data slice requiring rebuilding; and
- when the cause for the identified data slice requiring rebuilding is one of corruption or out-of-date, write the rebuilt data slice to the corresponding one of the plurality of slice servers assigned to store the identified data slice; and
    - when the cause for the identified data slice requiring rebuilding is a missing data slice: write the rebuild data slice to the new slice server; and
    - update the plurality of slice servers to include the new slice server and to remove the slice server corresponding to the identified data slice.

* * * * *

UNITED STATES PATENT AND TRADEMARK OFFICE
CERTIFICATE OF CORRECTION

PATENT NO. : 8,560,882 B2  
APPLICATION NO. : 12/716106  
DATED : October 15, 2013  
INVENTOR(S) : Vance T. Thornton et al.

Page 1 of 1

It is certified that error appears in the above-identified patent and that said Letters Patent is hereby corrected as shown below:

In the claims:

Col. 14, line 60, in claim 1: after "matrix in accordance" insert --with--

Signed and Sealed this  
Twenty-second Day of July, 2014

Michelle K. Lee  
*Deputy Director of the United States Patent and Trademark Office*